United States Patent
Takehara et al.

(10) Patent No.: US 9,749,322 B2
(45) Date of Patent: Aug. 29, 2017

(54) INFORMATION SHARING SYSTEM AND INFORMATION SHARING METHOD

(71) Applicants: Ken Takehara, Kanagawa (JP); Kunio Ozawa, Kanagawa (JP)

(72) Inventors: Ken Takehara, Kanagawa (JP); Kunio Ozawa, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/548,779

(22) Filed: Nov. 20, 2014

(65) Prior Publication Data
US 2015/0143488 A1 May 21, 2015

(30) Foreign Application Priority Data

Nov. 20, 2013 (JP) .................. 2013-240486
Nov. 13, 2014 (JP) .................. 2014-231093

(51) Int. Cl.
*H04L 29/06* (2006.01)
*H04W 12/06* (2009.01)
*H04W 12/08* (2009.01)

(52) U.S. Cl.
CPC .............. *H04L 63/10* (2013.01); *H04L 63/08* (2013.01); *H04L 63/083* (2013.01);
(Continued)

(58) Field of Classification Search
CPC ..... H04L 63/08; H04L 63/10; H04L 63/0838; H04L 65/4015; H04W 12/06; H04W 12/08
See application file for complete search history.

(56) References Cited

U.S. PATENT DOCUMENTS 8,627,438 B1 * 1/2014 Bhimanaik ............. H04L 63/10
 726/9
9,158,770 B1 * 10/2015 Beadles ............ G06F 17/30047
(Continued)

FOREIGN PATENT DOCUMENTS

JP 2013-039701 2/2013
JP 2014219762 A 11/2014
WO WO2012069845 * 5/2012

*Primary Examiner* — Robert Leung
(74) *Attorney, Agent, or Firm* — Harness, Dickey & Pierce, P.L.C.

(57) ABSTRACT

An information sharing system according to an embodiment includes an information processing system and a terminal and display device connected to the information processing system via a network. The information processing system is composed of one or more information processing apparatuses. The display device is equipped with a display unit on which an image is displayed. The display device includes a first identification-information acquiring unit that acquires identification information for identifying the display device on the network. The terminal acquires the identification information from the display device, and accesses a storage service and acquires access information, and transmits the acquired identification information and access information to the information processing system. The information processing system performs communication with the display device via the network on the basis of the identification information transmitted from the terminal, and accesses the storage service by using the access information transmitted from the terminal.

16 Claims, 29 Drawing Sheets

(52) U.S. Cl.
CPC ........... *H04L 65/403* (2013.01); *H04W 12/06* (2013.01); *H04W 12/08* (2013.01); *H04L 65/4015* (2013.01)

(56) References Cited

U.S. PATENT DOCUMENTS

| | | | |
|---|---|---|---|
| 2005/0289643 A1* | 12/2005 | Sato | H04L 63/0407 726/4 |
| 2014/0165152 A1* | 6/2014 | Farouki | H04N 7/15 726/4 |
| 2014/0250518 A1* | 9/2014 | Schneider | G06F 21/34 726/9 |
| 2014/0282961 A1* | 9/2014 | Dorfman | H04L 63/0823 726/7 |

* cited by examiner

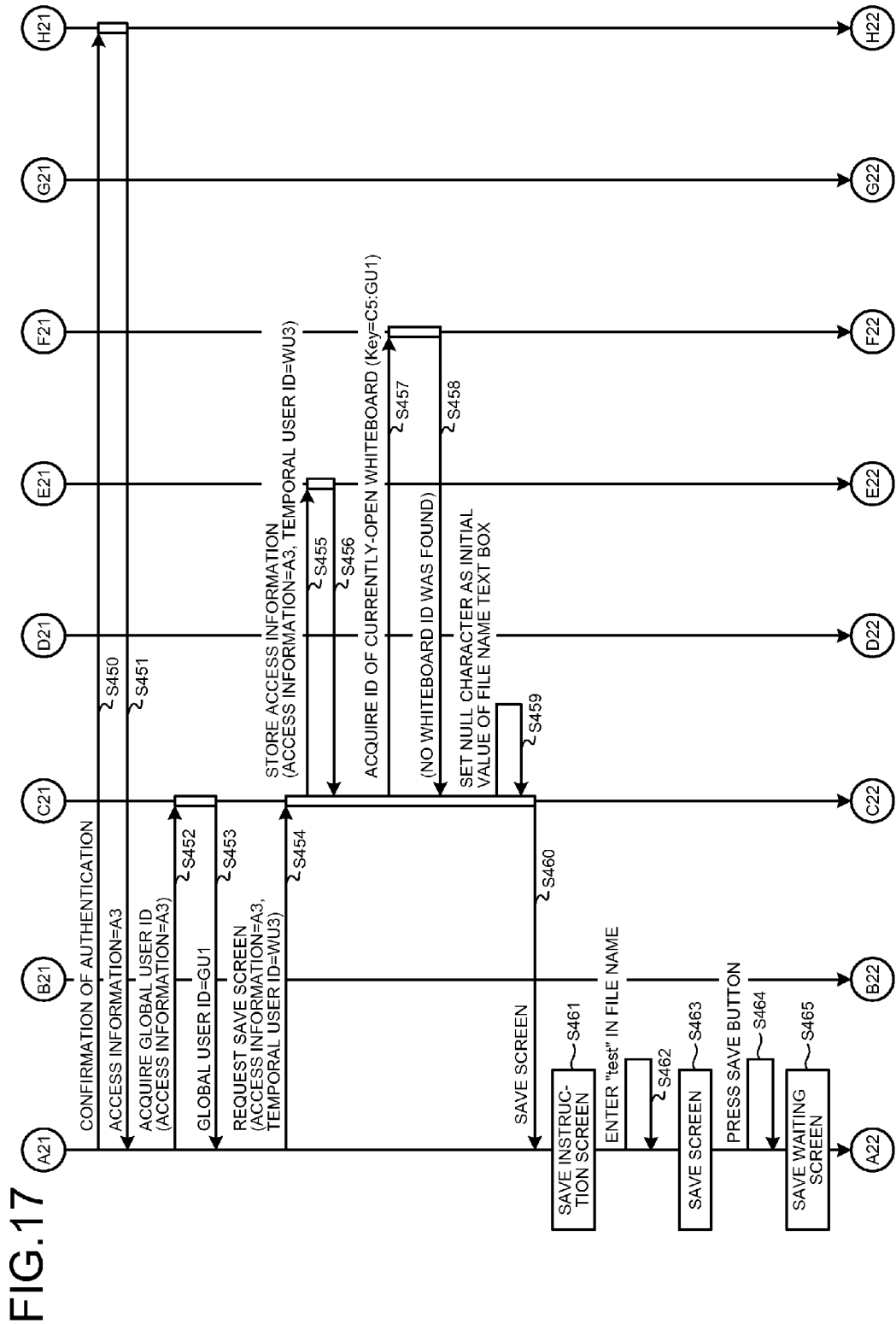

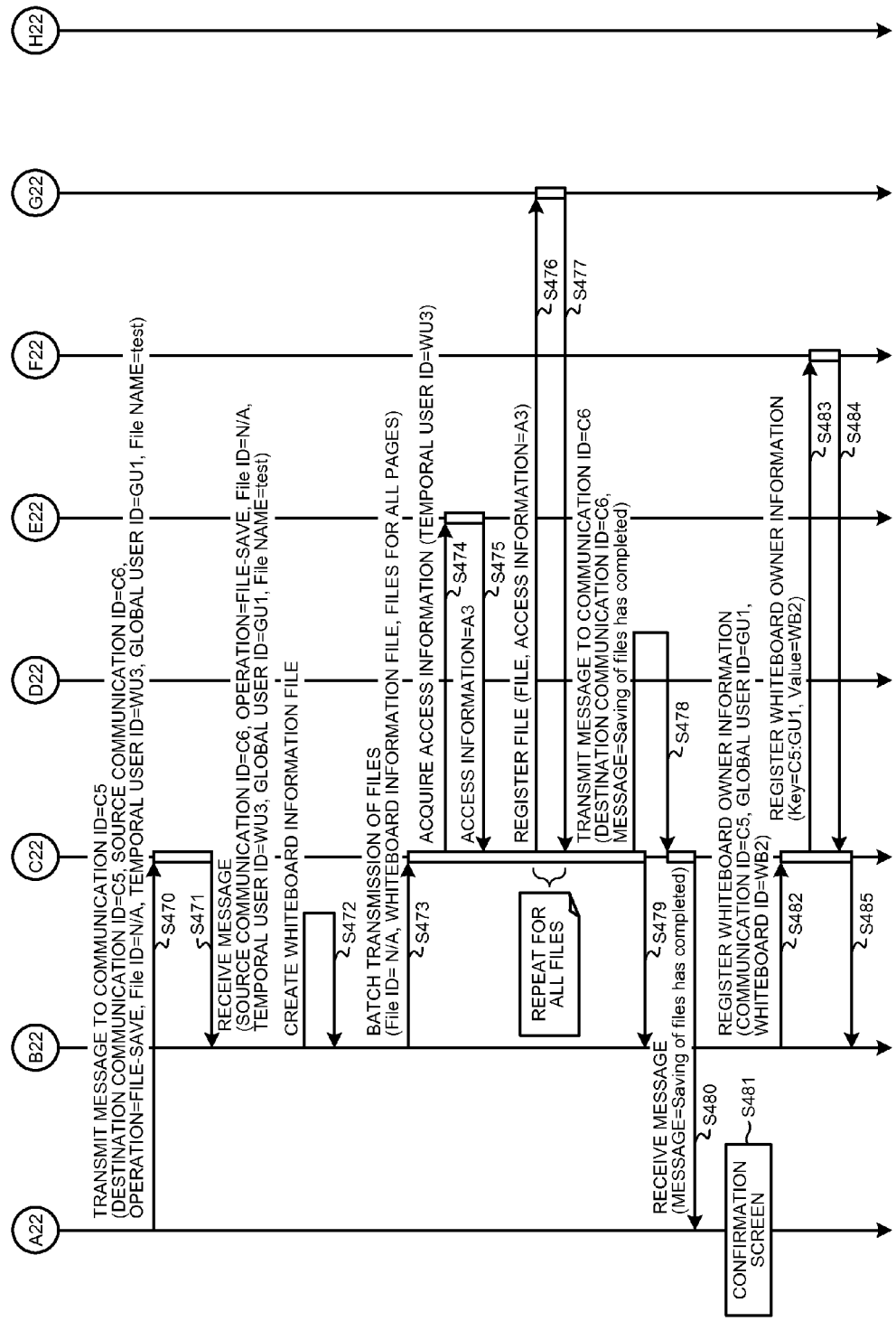

FIG.19

| ITEM NAME | | | TYPE | EXPLANATION |
|---|---|---|---|---|
| whiteboardId | | | CHARACTER STRING | WHITEBOARD ID |
| whiteboardName | | | CHARACTER STRING | WHITEBOARD NAME |
| files | | | LAYOUT | LAYOUT OF PAGE DATA |
| | pageId | | CHARACTER STRING | PAGE ID |
| | thumbnails | | LAYOUT | LAYOUT OF INFORMATION OF THUMBNAIL PASTED ON PAGE |
| | | pageId | CHARACTER STRING | PAGE ID OF LINK FROM THUMBNAIL |
| | | x | NUMERICAL VALUE | X-COORDINATE OF THUMBNAIL |
| | | y | NUMERICAL VALUE | Y-COORDINATE OF THUMBNAIL |
| | | w | NUMERICAL VALUE | WIDTH OF THUMBNAIL |
| | | h | NUMERICAL VALUE | HEIGHT OF THUMBNAIL |

FIG.20

```
{
  "whiteboardId":"kNynOBhPkW-XEAV_HbX6l-8O4oJsMxYbzzcCEHLJciGLnEWBHKbY7Ul2_qS3l1x3",
  "whiteboardName":"WHITEBOARD NAME",
  "files":[
    {
      "pageId":"Zmb5q7jlK7DqPLzQ6BTwiapr_PRiqodG75Shnto4-CdcMiCEjD2PPkwpZC3CP4HH",
      "thumbnails":[
        {
          "pageId":"xVCsrjYmHO-mVkXClBPKLGMpl8XPM4IF982sZ3nN8-AC2_ib_pVX94bXHo0cKcu_",
          "x":"100","y":"200","w":"200","h":"120"
        }
      ]
    },{
      "pageId":"xVCsrjYmHO-mVkXClBPKLGMpl8XPM4IF982sZ3nN8-AC2_ib_pVX94bXHo0cKcu_",
      "thumbnails":[
      ]
    }
  ]
}
```

(a)

(b)

(a)

(b)

(a)

(b)

(c)

(a)

(b)

(a)

(b)

(c)

(d)

INFORMATION SHARING SYSTEM AND INFORMATION SHARING METHOD

CROSS-REFERENCE TO RELATED APPLICATIONS

The present application claims priority to and incorporates by reference the entire contents of Japanese Patent Application No. 2013-240486 filed in Japan on Nov. 20, 2013 and Japanese Patent Application No. 2014-231093 filed in Japan on Nov. 13, 2014.

BACKGROUND OF THE INVENTION

1. Field of the Invention

The present invention relates to an information sharing system and information sharing method capable of securely executing access to an external service on a network.

2. Description of the Related Art

Conventionally, there has been developed an electronic blackboard device (hereinafter, referred to as an "interactive whiteboard (IWB)") that displays information written thereon as image data (see Japanese Patent Application Laid-open No. 2013-39701). The IWB is configured as a so-called touch panel of which the front writing surface is composed of an integrated combination of a display device and a pointing device and is configured to output a signal according to the touch position.

The IWB acquires, for example, information written on the writing surface thereof by a user with a dedicated pen as image data by means of a touch panel function, and displays the image data on the display device composing the writing surface. Furthermore, the IWB can store the acquired image data in a memory or output the acquired image data to the outside through a communication interface. Moreover, the IWB can capture image data supplied from the outside through the communication interface and display the image data on the display device composing the writing surface.

Furthermore, recently, there has also been developed a technology to give a presentation or the like by using a large-sized tablet computer with a large display (touch panel). Especially, in the case of using a tablet computer with an extremely-large touch panel of, for example, 80 inches in diagonal size, the tablet computer can achieve the same functions as the above-described IWB. Hereinafter, such an IWB and a tablet computer used for the same purpose as the IWB are collectively referred to as "IWB".

Meanwhile, a storage service that a server on the Internet provides a data storage area to a user has become common in recent years. When a user uses this storage service, the user registers user identifying information on the server in advance and transmits the user identifying information to the server when accessing the storage service to store data in the storage service or retrieve data from the storage service. As the user identifying information, a combination of a user name and a password is often used. The server performs authentication of the user identifying information transmitted from the user, and, when having authenticated the user, allows the user to access the storage service.

By using this storage service, the user can freely use his/her data without carrying the data as long as the user is in a given Internet connection environment. For example, even when the user borrows someone's computer at the place where the user went out, as long as the computer can be connected to the Internet, the user can access the storage service and perform download, update, or storage of his/her data.

Here, let's think of using a storage service through the above-described IWB. Also in this case, when accessing the storage service through the IWB, a user needs to be authenticated by a server which provides the storage service on the basis of user identifying information. More specifically, when the user acquires data from the storage service, the user inputs a user's name and a password to the IWB to transmit the user name and the password to the server.

At this time, as an input means for inputting the user identifying information, generally, a keypad displayed on the screen of the IWB is used. However, a large keypad is displayed in accordance with the size of the screen; therefore, there is a problem that the input user identifying information may be easily seen by others.

To cope with this, a small-sized screen or input means can be prepared in advance so as to prevent the act of inputting user identifying information from being seen by others. However, in this case, there is a problem that the reduction in size may cause a decrease in operability.

In view of the above, there is a need to enable a storage service to be securely used through a screen that many users can share.

SUMMARY OF THE INVENTION

It is an object of the present invention to at least partially solve the problems in the conventional technology.

According to the present invention, there is provided an information sharing system comprising: an information processing system composed of one or more information processing apparatuses; and a terminal and display device connected to the information processing system via a network, the display device being equipped with a display unit on which an image is displayed, wherein the display device includes a first identification-information acquiring unit that acquires identification information for identifying the display device on the network, the terminal includes: a second identification-information acquiring unit that acquires the identification information from the display device; a first access unit that accesses a storage service via the network and acquires access information; and a transmitting unit that transmits the identification information acquired by the second identification-information acquiring unit and the access information acquired by the first access unit to the information processing system, and the information processing system includes: a communication unit that performs communication with the display device via the network on the basis of the identification information transmitted from the terminal; and a second access unit that accesses the storage service by using the access information transmitted from the terminal.

The present invention also provides an information sharing method implemented by an information sharing system including an information processing system composed of one or more information processing apparatuses and a terminal and display device connected to the information processing system via a network, the display device being equipped with a display unit on which an image is displayed, the information sharing method comprising: first acquiring, by the display device, identification information for identifying the display device on the network; second acquiring, by the terminal, the identification information from the display device; first accessing, by the terminal, a storage service via the network and acquiring access information; transmitting, by the terminal, the identification information acquired at the second acquiring and the access information acquired at the first accessing to the information processing system; performing communication with, by the information processing system, the display device via the network on the basis of the identification information transmitted from the terminal; and second accessing, by the information processing system, the storage service by using the access information transmitted from the terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a sequence diagram illustrating an example of a process according to the embodiment;

FIG. 18 is a sequence diagram illustrating an example of a process according to the embodiment;

FIG. 19 is a diagram illustrating an example of the format of a whiteboard information file applicable to the embodiment;

FIG. 20 is a diagram illustrating an example of a data string stored in the whiteboard information file applicable to the embodiment;

DETAILED DESCRIPTION OF THE PREFERRED EMBODIMENTS

Figure 1:
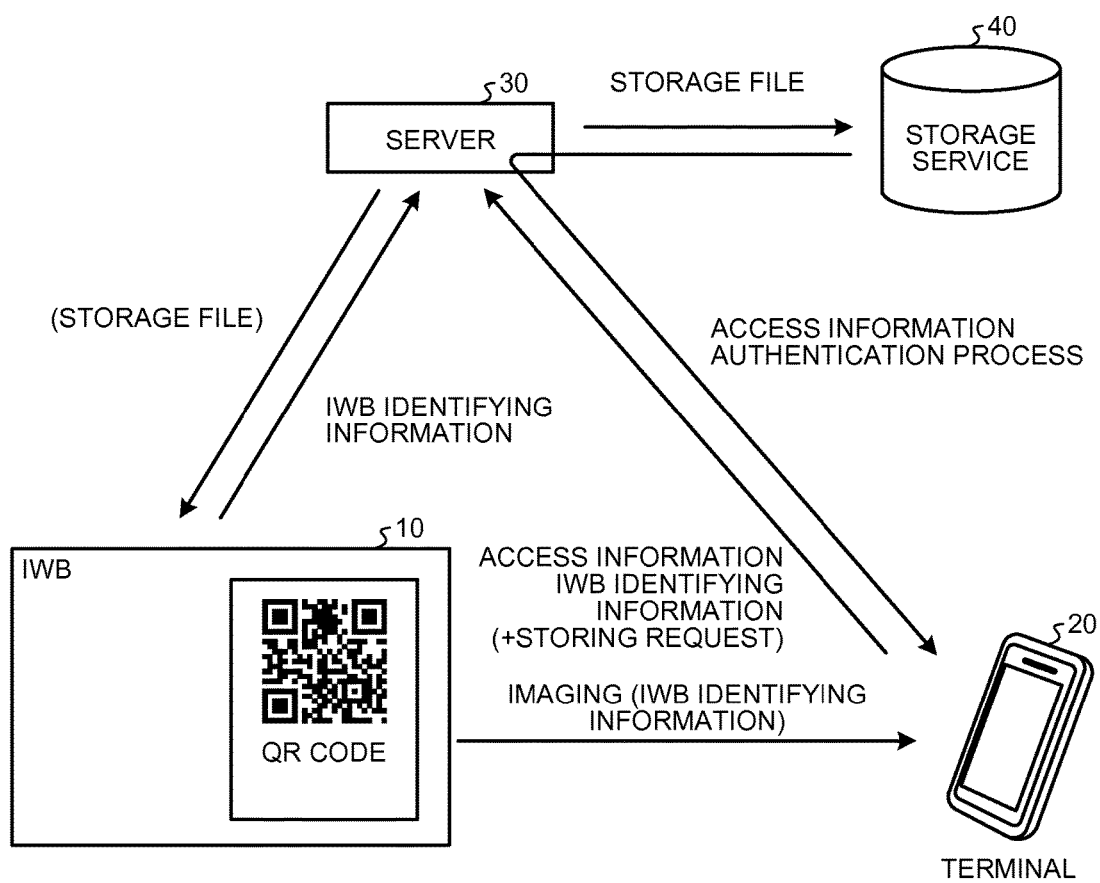
FIG. 1 is a diagram schematically illustrating an example of an information sharing system according to an embodiment of the present invention.

An exemplary embodiment of an information sharing system and information sharing method according to the present invention is explained in detail below with reference to accompanying drawings. FIG. 1 schematically shows an example of the information sharing system according to the embodiment. In FIG. 1, an information sharing system 1 includes an electronic blackboard device 10, a terminal 20, and a server device 30 connected to the electronic blackboard device 10 and the terminal 20 via the Internet.

The electronic blackboard device 10 is a display device that is provided with a touch panel composed of an integrated combination of an input device and a display device as a user input unit and a display unit and displays a character or graphic directly drawn on the touch panel on the touch panel. The electronic blackboard device 10 as a display device is provided with a relatively-large touch panel having an effective display area of several tens of inches (for example, 80 inches or more) in diagonal size so that many people can share information displayed on the touch panel. Furthermore, content drawn on the touch panel can be stored as an image in internal storage or an external storage device connected to the electronic blackboard device 10 via a network.

The electronic blackboard device 10 can be fixed like a so-called whiteboard, or can be portable like a large-sized tablet computer. Hereinafter, the electronic blackboard device 10 is referred to as the interactive whiteboard (IWB) 10.

The terminal 20 is a portable information processing apparatus having an Internet connection function; for example, a smartphone (a multifunctional mobile terminal) can be used. The terminal 20 includes a relatively-small touch panel having an effective display area of, for example, several inches to several tens of inches in diagonal size. Furthermore, the terminal 20 has an imaging function, and can take an image of a subject and capture the image. Moreover, the terminal 20 can arbitrarily download application software, for example, from the Internet and install the application software therein. Hereinafter, application software installed in the terminal 20 is referred to as app.

The server device 30 is an information processing system constructed on a network cloud. The network cloud is a network group that includes multiple computers connected to one another via a network and works as a black box of which the inside is not seen externally but shows its input/output only. In the network cloud, one or more computers compose the server device 30 as an information processing system. Needless to say, the server device 30 is not limited to be constructed on the network cloud.

The information sharing system 1 according to the embodiment stores data of an image which has been drawn, i.e., has been input to the IWB 10 in a storage service 40 which is a server device or server system composed of one or more information processing apparatuses provided on the Internet. The storage service 40 gives an account to a user who has performed user registration, and provides, for example, a storage area to the user in accordance with the account. The user registration is performed by setting, for example, a user's name or e-mail address as user identifying information in combination with a password in the storage service 40; when the user uses the storage service 40, the user transmits this user identifying information and the password to the storage service 40. When the combination of the user identifying information and the password has been authenticated by the storage service 40, the user can log in to the storage service 40 by using the user identifying information and the password as login information and use a storage area provided by the storage service 40.

In such a configuration, when the IWB 10 has been started, the IWB 10 communicates with the server device 30 and acquires IWB identifying information for identifying the IWB 10 on the Internet from the server device 30. The IWB identifying information is identification information generated temporarily by the server device 30.

When storing an image drawn and input to the IWB 10 in the storage service 40, the user performs a user operation on the IWB 10 to instruct the IWB 10 to store the image. In accordance with this user operation, the IWB 10 transmits information including the IWB identifying information and a storage command ordering storage of the image to the server device 30. The server device 30 generates an encoded image that the information transmitted from the IWB 10 is encoded into predetermined image information, and transmits the encoded image to the IWB 10. The IWB 10 displays this encoded image on the display unit. The encoded image is a matrix two-dimensional code, such as a QR code (registered trademark). However, an encoded image is not limited to this, and can be a bar code or an image in another format.

When the encoded image has been displayed on the IWB 10, the user takes a picture of the encoded image displayed on the IWB 10 with use of the imaging function of the terminal 20. Then, the terminal 20 detects the encoded image from the taken picture and decodes the encoded image through the use of an app which has been built into the terminal 20 in advance, and extracts the IWB identifying information and storage command included in the encoded image. Incidentally, as the app to decode an encoded image, a standard app installed in, for example, a smartphone can be used.

Furthermore, the user performs user registration on the storage service 40 through the terminal 20 and acquires an account for using a storage area of the storage service 40 in advance. Then, the user log in to the storage service 40 through the terminal 20, and, when having authenticated by the storage service 40, acquires access information for permitting access to the storage area of the storage service 40.

In accordance with a user's storing instruction operation performed on the terminal 20, the terminal 20 transmits the acquired access information together with the IWB identifying information and storage command extracted from the encoded image to the server device 30.

When the server device 30 has received the IWB identifying information, the storage command, and the access information from the terminal 20, the server device 30 requests a file to be stored in the storage service 40 from the IWB 10 by using the IWB identifying information. Actually, the IWB 10 polls the server device 30, and monitors whether information including IWB identifying information of the IWB 10 has been transmitted from the server device 30. The server device 30 acquires a file from the IWB 10 in response to the request.

At this time, the server device 30 accesses the storage service 40 by using the access information transmitted from the terminal 20. Accordingly, the server device 30 can use a storage area that the storage service 40 provides to the account of the terminal 20. The server device 30 transmits the file acquired from the IWB 10 to the storage service 40 and stores the file in the storage area.

As described above, according to the embodiment, a file on the IWB 10 can be stored in the storage service 40 by performing a storing operation on the terminal 20. Therefore, login information for login to the storage service 40, etc. is not explicitly displayed on the IWB 10.

Figure 2:
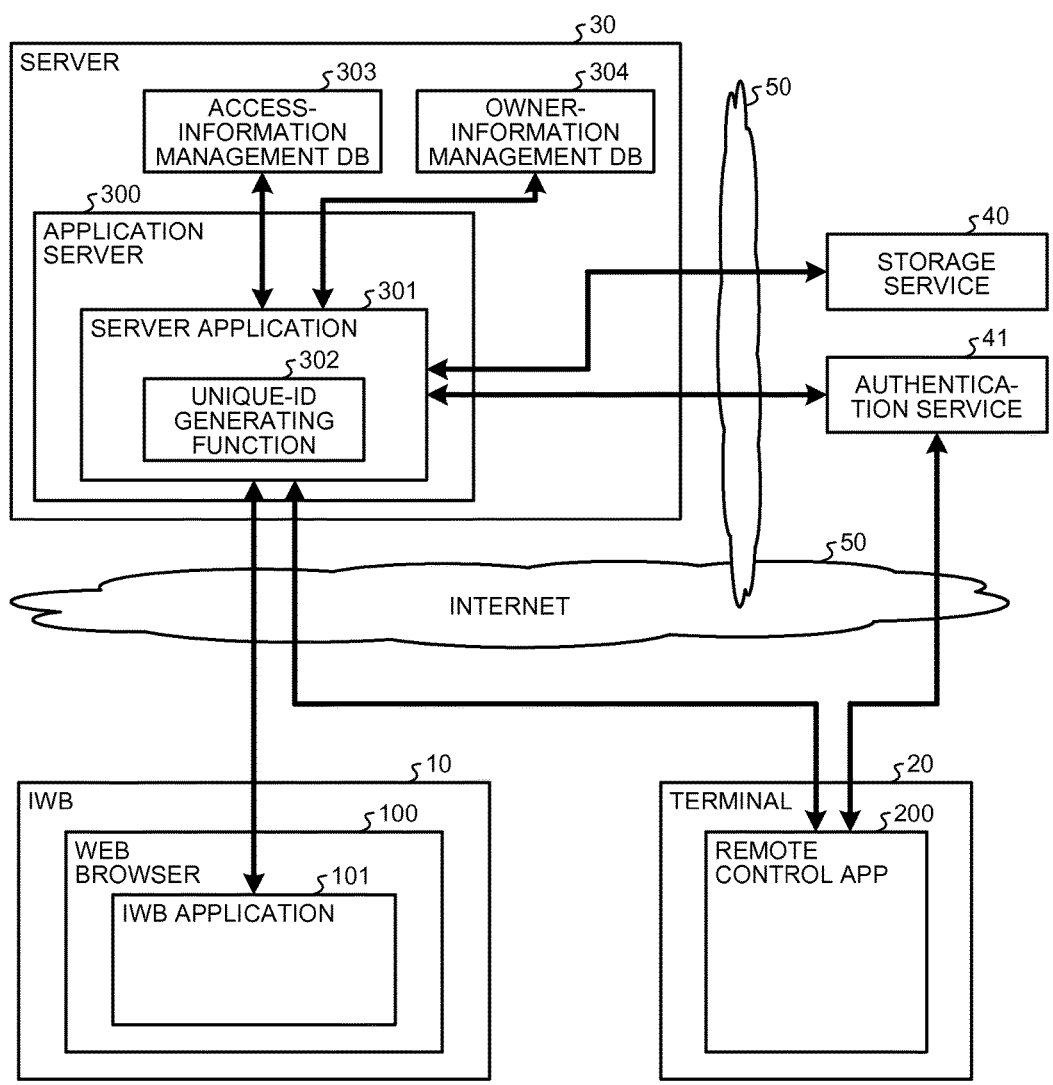
FIG. 2 is a block diagram illustrating an example of a system configuration of the information sharing system applicable to the embodiment.

FIG. 2 shows an example of a system configuration of the information sharing system 1 applicable to the embodiment. The IWB 10 and the terminal 20 are connected to the server device 30 via Internet 50. Furthermore, the server device 30 is connected to the storage service 40 and an authentication service 41 via the Internet 50. The terminal 20 is connected to the authentication service 41 via the Internet 50. The authentication service 41 is composed of one or more information processing apparatuses. Incidentally, in the embodiment, the IWB 10 and the terminal 20 do not have to be connected to each other via a network.

The IWB 10 is equipped with a Web browser 100 as application software, and an IWB application 101 which performs above-described operation according to the embodiment is configured as application software running on the IWB application 101. For example, the IWB application 101 is written by using JAVA™ language or the like; by the Web browser 100 accessing a given URL (Uniform Resource Locator) provided by the server device 30, the IWB application 101 is downloaded from the server device 30 and becomes executable.

The terminal 20 is equipped with a remote control app 200 as an app to perform above-described operation according to the embodiment. The remote control app 200 controls imaging of an encoded image displayed on the IWB 10, acquisition of IWB identifying information and a storage command from the taken encoded image, and transmission of access information acquired from the storage service 40, the IWB identifying information, and the storage command to the server device 30.

Incidentally, the terminal 20 is equipped with, for example, a Web browser (not shown); a login process to log in to the storage service 40 is performed through a login screen presented on the Web browser by the authentication service 41. The authentication service 41 authenticates the terminal 20 on the basis of login information transmitted from the terminal 20, and, when the authentication is successful, issues access information for permitting use of a storage area of the storage service 40 to the terminal 20.

The server device 30 includes an application server 300, an access-information management database (DB) 303, and an owner-information management DB 304. The application server 300 manages a variety of application software installed in the server device 30. In the embodiment, the application server 300 includes a server application 301 to perform above-described operation according to the embodiment. The server application 301 temporarily issues identification information to the terminal 20 and the IWB 10.

Furthermore, the server application 301 manages access information for access to the storage service 40 which has been transmitted from the terminal 20 in the access-information management DB 303 in a manner associated with user identifying information temporarily issued to the terminal 20. Moreover, the server application 301 associates IWB identifying information temporarily issued to the IWB 10 with user information of the terminal 20 based on the access information, and manages these in the owner-information management DB 304.

Furthermore, the server application 301 stores therein the IWB application 101 for the IWB 10 to perform operation according to the embodiment. For example, when the IWB 10 has been started, for example, by the Web browser 100, the IWB 10 connects to the server device 30 and downloads the IWB application 101 from the server application 301.

Figure 3:
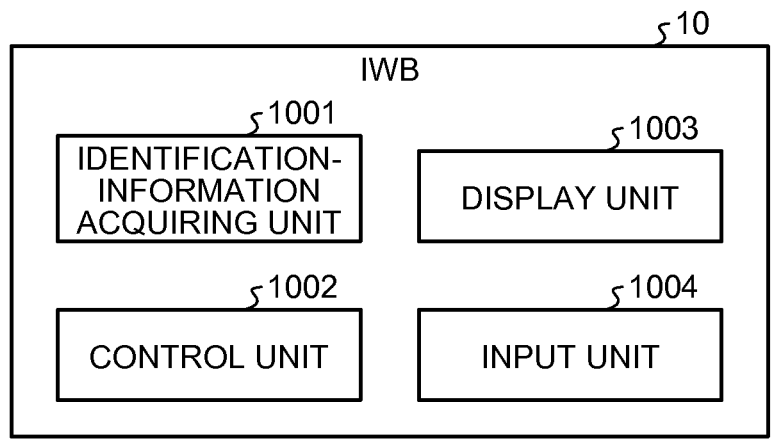
FIG. 3 is an example of a functional block diagram for explaining functions of an IWB applicable to the embodiment.

FIG. 3 is an example of a functional block diagram for explaining functions of the IWB (electronic blackboard device) 10 applicable to the embodiment. The IWB 10 includes an identification-information acquiring unit 1001, a control unit 1002, a display unit 1003, and an input unit 1004.

The identification-information acquiring unit 1001 is a first identification-information acquiring unit that requests IWB identifying information from the server device 30, and acquires IWB identifying information issued by the server device 30 in response to the request from the server device 30, and then stores therein the acquired IWB identifying information. The control unit 1002 controls the operation of the entire IWB 10 in accordance with a predetermined program. The display unit 1003 displays an image on the touch panel in accordance with the control by the control unit 1002. The input unit 1004 receives a user input made on the touch panel and passes the user input to the control unit 1002.

The IWB 10 includes, for example, a central processing unit (CPU), a read-only memory (ROM), and a random access memory (RAM); the identification-information acquiring unit 1001, the control unit 1002, the display unit 1003, and the input unit 1004 are realized by the CPU executing a program stored in the ROM with the RAM as a working memory. Furthermore, in the IWB 10, all or some of the functions of the identification-information acquiring unit 1001, the control unit 1002, the display unit 1003, and the input unit 1004 are included in the IWB application 101.

Figure 4:
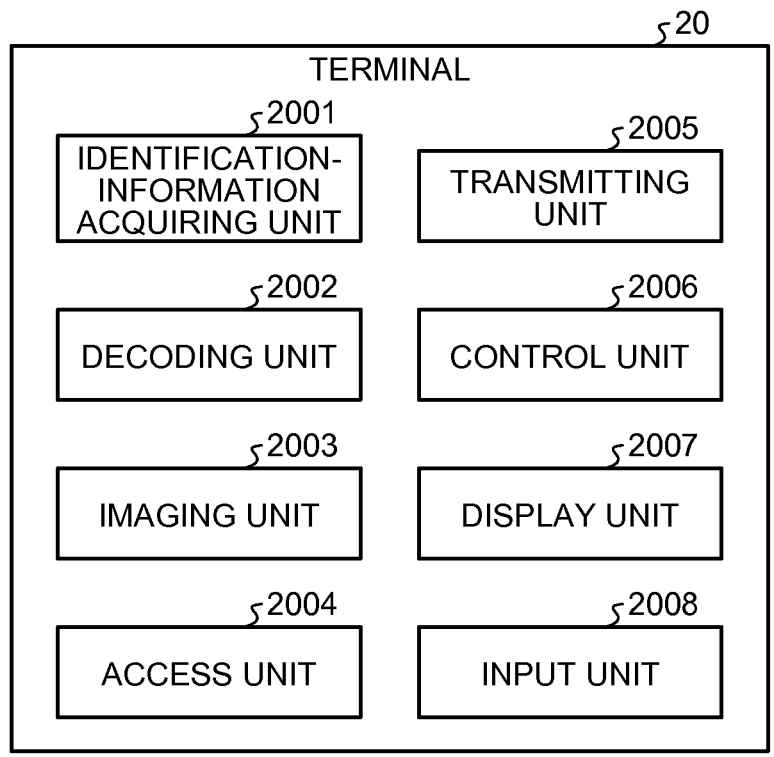
FIG. 4 is an example of a functional block diagram for explaining functions of a terminal applicable to the embodiment.

FIG. 4 is an example of a functional block diagram for explaining functions of the terminal 20 applicable to the embodiment. The terminal 20 includes an identification-information acquiring unit 2001, a decoding unit 2002, an imaging unit 2003, an access unit 2004, a transmitting unit 2005, a control unit 2006, a display unit 2007, and an input unit 2008.

The identification-information acquiring unit 2001 requests terminal identifying information for identifying the terminal 20 from the server device 30, and acquires terminal identifying information issued by the server device 30 in response to the request, and then stores therein the acquired terminal identifying information. The imaging unit 2003 controls imaging optics, and takes an image of a subject and acquires the taken image.

The decoding unit 2002 decodes an encoded image taken/acquired by the imaging unit 2003, and extracts information included in the encoded image. That is, the imaging unit 2003 and the decoding unit 2002 compose a second identification-information acquiring unit that acquires IWB identifying information from the IWB 10. The access unit 2004 accesses the storage service 40 (the authentication service 41) via the Internet 50, and log in to the storage service 40 by using login information and acquires access information.

The transmitting unit 2005 transmits information to the server device 30 via the Internet 50. For example, the transmitting unit 2005 transmits IWB identifying information and a command which have been decoded by the decoding unit 2002 and access information acquired by the access unit 2004 to the server device 30.

The control unit 2006 controls the operation of the entire terminal 20 in accordance with a predetermined program. The display unit 2007 displays an image on a display device included in the terminal 20 in accordance with the control by the control unit 2006. The input unit 2008 receives a user input made on an input device included in the terminal 20 and passes the user input to the control unit 2006. Incidentally, in the terminal 20, the display unit 2007 and the input unit 2008 are configured, for example, as a touch panel composed of an integrated combination of the display device and the input device.

The terminal 20 includes, for example, a CPU, a ROM, and a RAM; the identification-information acquiring unit 2001, the decoding unit 2002, the imaging unit 2003, the access unit 2004, the transmitting unit 2005, the control unit 2006, the display unit 2007, and the input unit 2008 are realized, for example, by the CPU executing a program stored in the ROM with the RAM as a working memory.

Figure 5:
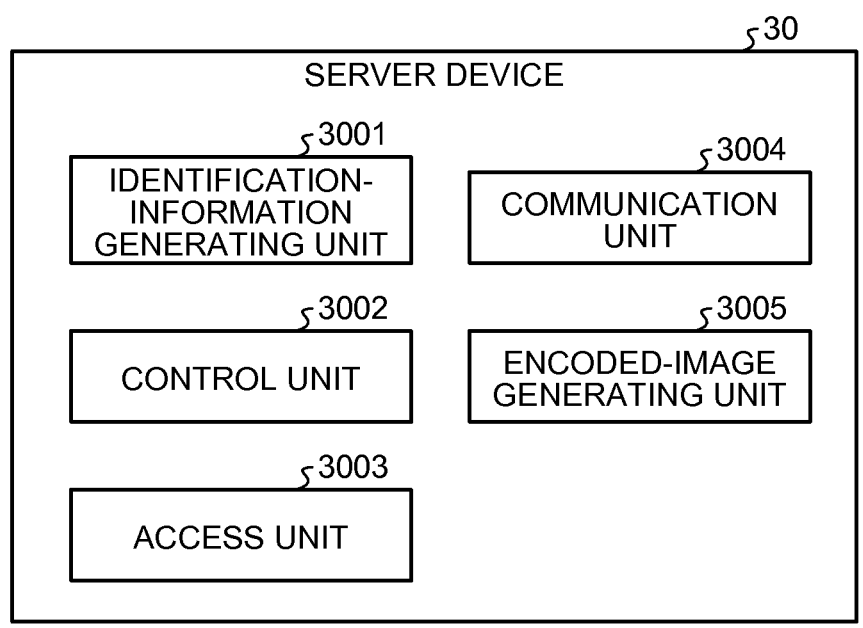
FIG. 5 is an example of a functional block diagram for explaining functions of a server device applicable to the embodiment.
Figure 6:
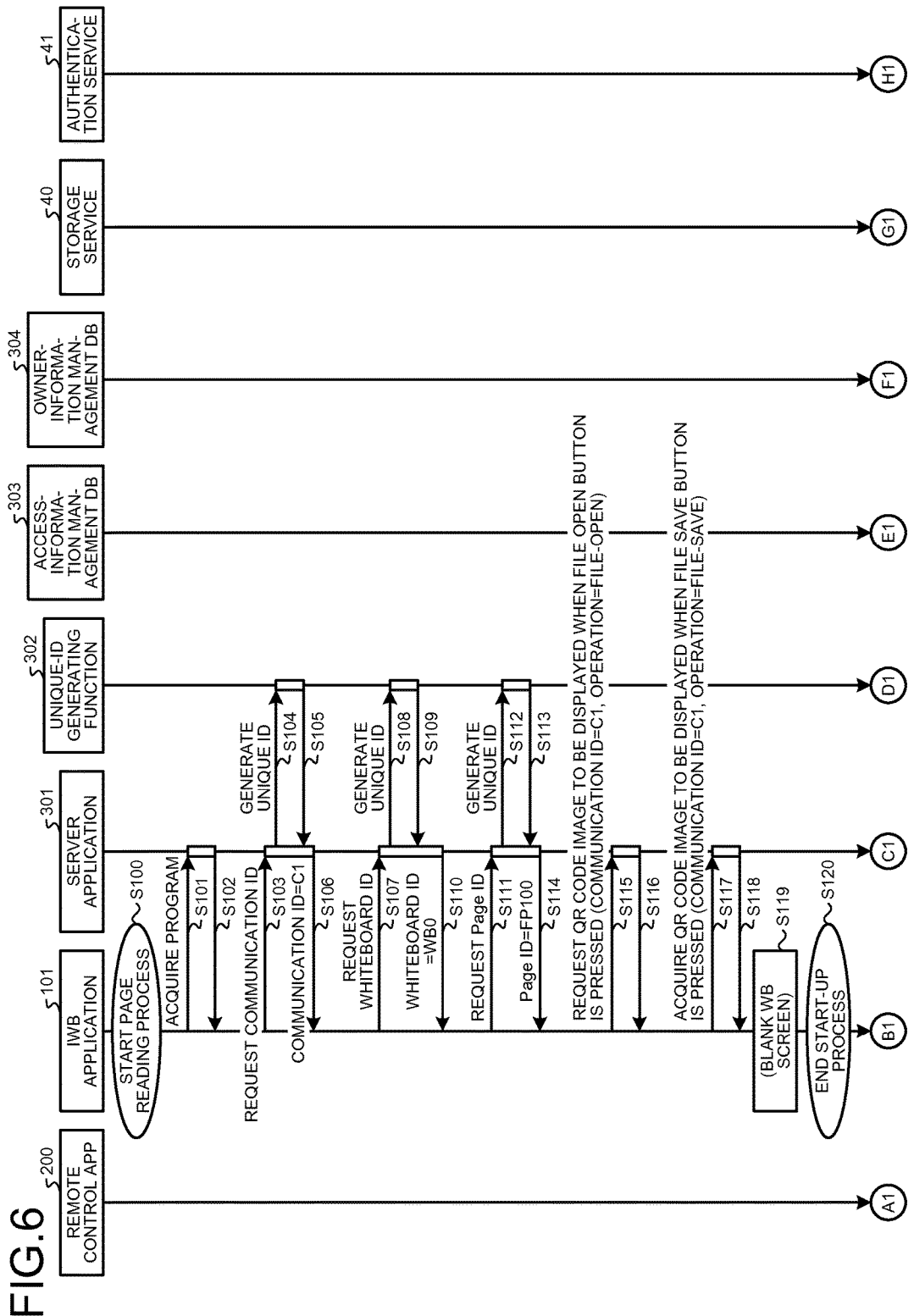
FIG. 6 is a sequence diagram illustrating an example of a process according to the embodiment.

FIG. 5 is an example of a functional block diagram for explaining functions of the server device 30 applicable to the embodiment. The server device 30 includes an identification-information generating unit 3001, a control unit 3002, an access unit 3003, a communication unit 3004, and an encoded-image generating unit 3005. The control unit 3002 controls the operation of the entire server device 30 in accordance with a predetermined program. Furthermore, as described above, the server device 30 is a system constructed on a network cloud, and the identification-information generating unit 3001, the control unit 3002, the access unit 3003, and the communication unit 3004 are constructed on multiple computers, for example, in a distributed manner.

The identification-information generating unit 3001 corresponds to a unique-ID generating function 302, and generates identification information in response to a request from the IWB 10 or the terminal 20. The access unit 3003 accesses the storage service 40 by using access information transmitted from the terminal 20, and uses a storage area that the storage service 40 provides to the terminal 20. The communication unit 3004 performs communication with the IWB 10 via Internet 50. The encoded-image generating unit 3005 generates an encoded image composed of, for example, a matrix two-dimensional code on the basis of IWB identifying information and a storage command ordering storage of a file which have been transmitted from the IWB 10.

In the server device 30, all or some of the identification-information generating unit 3001, the control unit 3002, the access unit 3003, the communication unit 3004, and the encoded-image generating unit 3005 are included in the server application 301.

Operation According to Embodiment

Subsequently, an example of operation to store data on the IWB 10 in the storage service 40, which is performed in the information sharing system 1 according to the embodiment, is explained with FIGS. 6 to 32. Incidentally, out of FIGS. 6 to 32, FIGS. 6 to 18 are sequence diagrams showing data exchange among the IWB 10, the terminal 20, the server device 30, the storage service 40, and the authentication service 41. FIGS. 19 and 20 show an example of the format of a whiteboard information file in which information on an image on the IWB 10 is stored. FIGS. 21 to 32 show an example of respective screens of the terminal 20 and the IWB 10.

Incidentally, in the sequence diagrams shown in FIGS. 6 to 18, alphanumerals such as "A1", "B1", and "A11" denote that a process is continuous with a corresponding alphanumeral among the diagrams.

File Retrieving Process

First, there is explained a case where the IWB 10 retrieves an already-stored file from the storage service 40.

When the IWB 10 has been started by application of power or the like, the IWB 10 starts a page reading process (Step S100). When the page reading process has started, the IWB 10 acquires a program for performing operation according to the embodiment from the server device 30 (Steps S101 and S102).

For example, the IWB 10 runs the Web browser 100 in response to a predetermined user operation after the application of power, and accesses the server application 301 of the server device 30 in accordance with a URL (Uniform Resource Locator) stored in the Web browser 100 in advance. Then, the IWB 10 downloads the IWB application 101 as a program for performing operation according to the embodiment from the server application 301, and executes the IWB application 101 on the Web browser 100.

Incidentally, a page corresponds to one image display area on the IWB 10. The IWB 10 can store an image drawn on a page in a predetermined storage medium. The page reading process is a process of reading an image stored in the storage medium on a per-page basis. In the embodiment, an image on a page is stored in a storage area of the storage service 40.

Hereinafter, operation of the IWB 10 is described as operation of the IWB application 101. Furthermore, operation of the server device 30 is described as operation of the server application 301, unless otherwise stated.

At Step S103, the IWB application 101 requests a communication ID from the server application 301. The communication ID is identification information used to identify the IWB application 101 on the Internet 50. The server application 301 generates a unique communication ID in response to the request from the IWB application 101 (Steps S104 and S105). Here, communication ID=C1 is generated.

The generated communication ID is transmitted from the server device 30 to the IWB 10 via the Internet 50 by the server application 301, and is received by the IWB application 101 (Step S106).

At the next Step S107, the IWB application 101 requests a whiteboard ID from the server application 301. The server application 301 generates a unique whiteboard ID in response to the request from the IWB application 101 (Steps S108 and S109). Here, whiteboard ID=WB0 is generated. The generated whiteboard ID is transmitted from the server application 301 via the Internet 50, and is received by the IWB application 101 (Step S110).

At the next Step S111, the IWB application 101 requests a Page ID from the server application 301. The server application 301 generates a unique Page ID in response to the request from the IWB application 101 (Steps S112 and S113). Here, Page ID=FP100 is generated. The generated Page ID is transmitted from the server application 301 via the Internet 50, and is received by the IWB application 101 (Step S114).

Incidentally, the server application 301 does not store therein the generated unique IDs. Furthermore, the server application 301 does not generate the same ID.

At the next Step S115, the IWB application 101 transmits the communication ID (=C1) and a file open command ordering a file operation to open a file to the server device 30, and requests an encoded image such as a QR Code™ to be displayed when the file open operation is performed from the server application 301. In response to this request, the server application 301 generates an encoded image including the communication ID and the file open command. The generated encoded image is transmitted from the server application 301 to the IWB application 101 (Step S116).

At the next Step S117, the IWB application 101 transmits the communication ID (=C1) and a file save command ordering a file operation to save a file to the server device 30, and requests an encoded image such as a QR code (registered trademark) to be displayed when the file save operation is performed from the server application 301. In response to this request, the server application 301 generates an encoded image including the communication ID and the file save command. The generated encoded image is transmitted from the server application 301 to the IWB application 101 (Step S118).

At the next Step S119, the IWB application 101 causes the display unit 1003 to display a blank whiteboard screen on a display area 10030. Accordingly, the start-up process performed by the IWB 10 is terminated (Step S120).

Figure 21A:
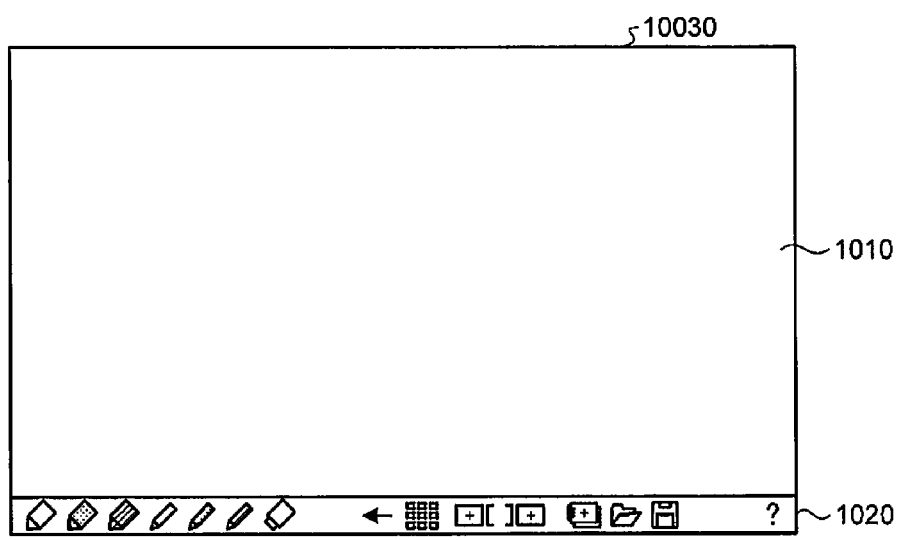
FIGS. 21(a) and 21(b) are diagrams illustrating an example of a whiteboard screen displayed by an IWB application according to the embodiment.
Figure 21B:
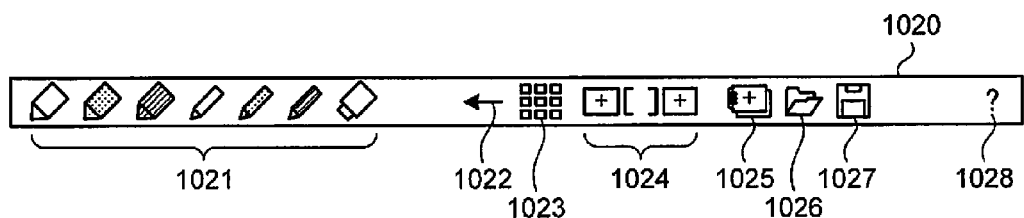

FIG. 21 shows an example of the blank whiteboard screen displayed on the display area 10030 by the IWB application 101 according to the embodiment. In FIG. 21(*a*), a blank drawing area 1010 and a menu bar 1020 are displayed on the display area 10030. On the drawing area 1010, an image based on an image drawn on the input unit 1004 by a user is displayed. Furthermore, an image retrieved from a predetermined storage medium can be displayed on the drawing area 1010.

In the menu bar 1020, various icons are set up by the IWB application 101. The IWB application 101 operates according to an operation made on an icon. FIG. 21(*b*) shows an example of the menu bar 1020 in more detail. Multiple icons 1021 to 1028 are set up in the menu bar 1020.

The icon 1021 includes multiple icons, and is for specifying a tool used for drawing an image on the drawing area 1010. The icon 1022 is for specifying an operation to return to the previous page. The icon 1023 is for displaying a list of page-by-page thumbnail images on a thumbnail display area in the drawing area 1010. By performing a drag-and-drop operation on a thumbnail image displayed on the thumbnail display area, the thumbnail image can be pasted in the drawing area 1010. The icon 1024 is for creating a new page in front of or behind a page currently displayed on the drawing area 1010. The icon 1025 is for clearing an image currently displayed on the drawing area 1010 and generating a blank drawing area 1010.

Figure 22:
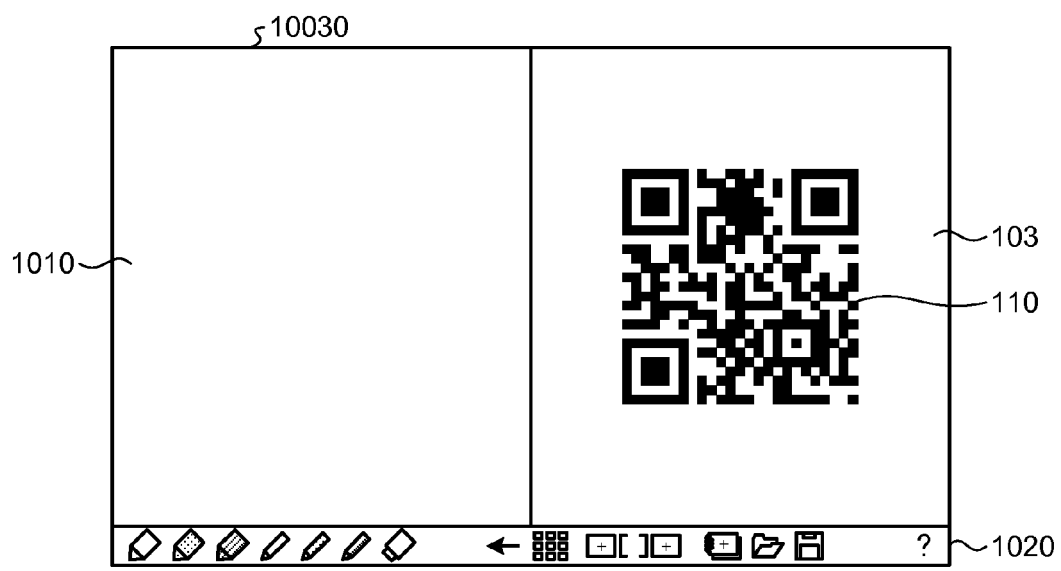
FIG. 22 is a diagram illustrating an example where an encoded image is displayed on the IWB.

The icon 1026 is for opening a page saved to the storage service 40 and updating an image displayed on the drawing area 1010 with an image of the open page. According to an operation performed on this icon 1026, the IWB application 101 displays an encoded image 110 acquired at the above-described Steps S115 and S116 on an encoded-image display area 103 as illustrated in FIG. 22. This encoded-image display area 103 is displayed in a manner overlapped with the drawing area 1010.

The icon 1027 is for saving an image of a page currently displayed on the drawing area 1010 to the storage service 40. According to an operation performed on this icon 1027, the IWB application 101 displays an encoded image 110 acquired at the above-described Steps S117 and S118 on the encoded-image display area 103 in the same manner as in FIG. 22.

The icon 1028 is for displaying help according to operation of the IWB application 101.

Figure 7:
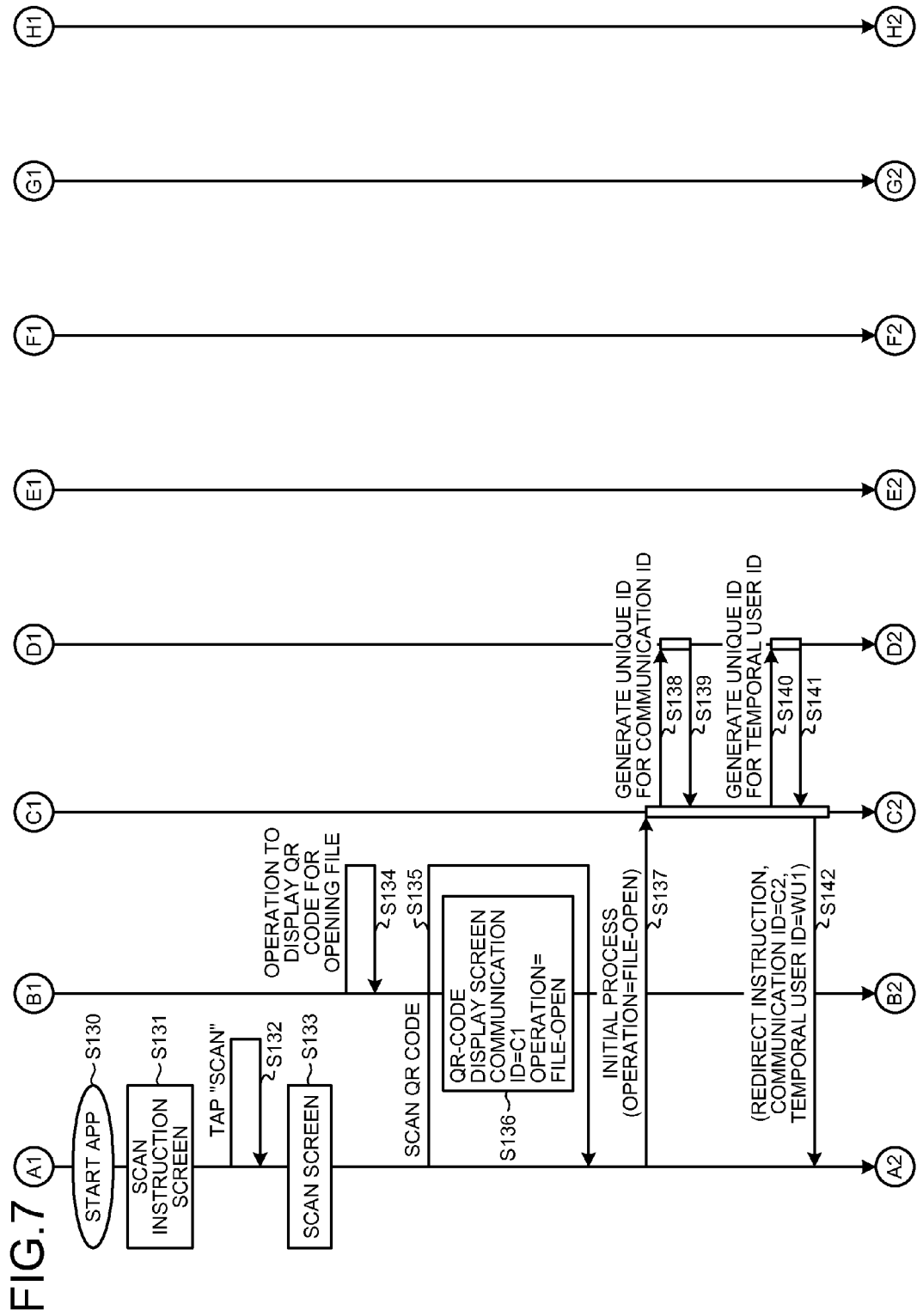
FIG. 7 is a sequence diagram illustrating an example of a process according to the embodiment.

Move on to FIG. 7. Incidentally, here, it is described that operation of the remote control app 200 shown in FIG. 7 is started after the end of the start-up process performed by the IWB application 101 at Step S120 in FIG. 6; however, the operation of the remote control app 200 and the operation of the IWB application 101 can be performed in parallel, or the operation of the remote control app 200 can be performed ahead of the operation of the IWB application 101.

Figure 23A:
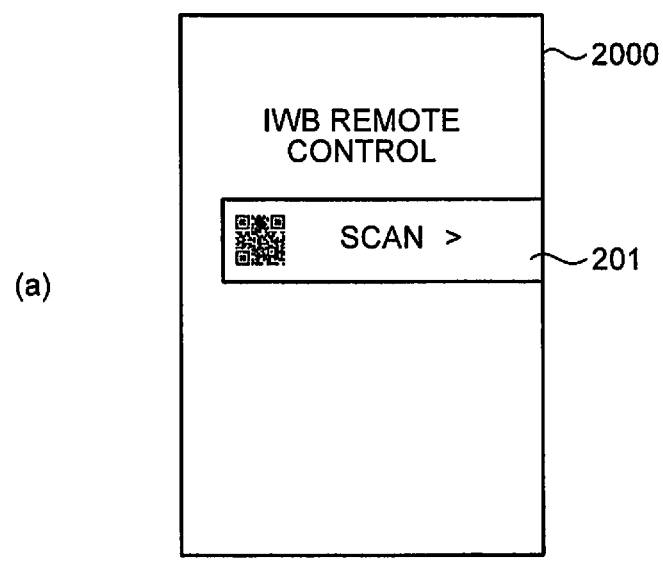
FIGS. 23(a) and 23(b) are diagrams illustrating an example of a display screen of the terminal according to the embodiment.

In the terminal 20, when the remote control app 200 has been started at Step S130, the remote control app 200 causes the display unit 2007 to display a scan instruction screen 2000 for scanning an encoded image displayed on the IWB 10 as illustrated in FIG. 23(a) (Step S131). When a scan instruction section 201 with "scan" displayed has been tapped by a user (Step S132), the remote control app 200 controls the imaging unit 2003 to start imaging, and causes the display unit 2007 to display a scan screen 2100 shown in FIG. 23(b) (Step S133).

Furthermore, the user operates the icon 1026 on the menu bar 1020 of the IWB 10 to instruct the IWB application 101 to open a file (Step S134). In response to this instruction, the IWB application 101 displays the encoded image 110 including the file open command acquired at Steps S115 and S116 on the encoded-image display area 103 as illustrated in FIG. 22 (Step S136).

The user adjusts an imaging range so that the encoded image 110 displayed at Step S136 fits within an imaging area 211 with reference to the scan screen 2100. When the remote control app 200 has recognized the encoded image 110, the remote control app 200 scans and acquires the encoded image 110 as an image (Step S135). This encoded image 110 includes the communication ID=C1 and the file open command as shown in Step S136.

At the next Step S137, the remote control app 200 communicates with the server device 30 via the Internet 50, and requests the server application 301 to perform an initial process according to the file open command. In response to this request, the server application 301 generates a communication ID and a temporal user ID as unique IDs for the terminal 20 by using the unique-ID generating function 302 (Steps S138 to S141). The server application 301 transmits the generated communication ID and temporal user ID to the terminal 20. Here, communication ID=C2 and temporal user ID=WU1 are generated. The communication ID=C2 and the temporal user ID=WU1 are received by the terminal 20, and then received by the remote control app 200 (Step S142). Furthermore, at this time, the server application 301 transmits an instruction to redirect to the storage service 40 to the remote control app 200.

Figure 8:
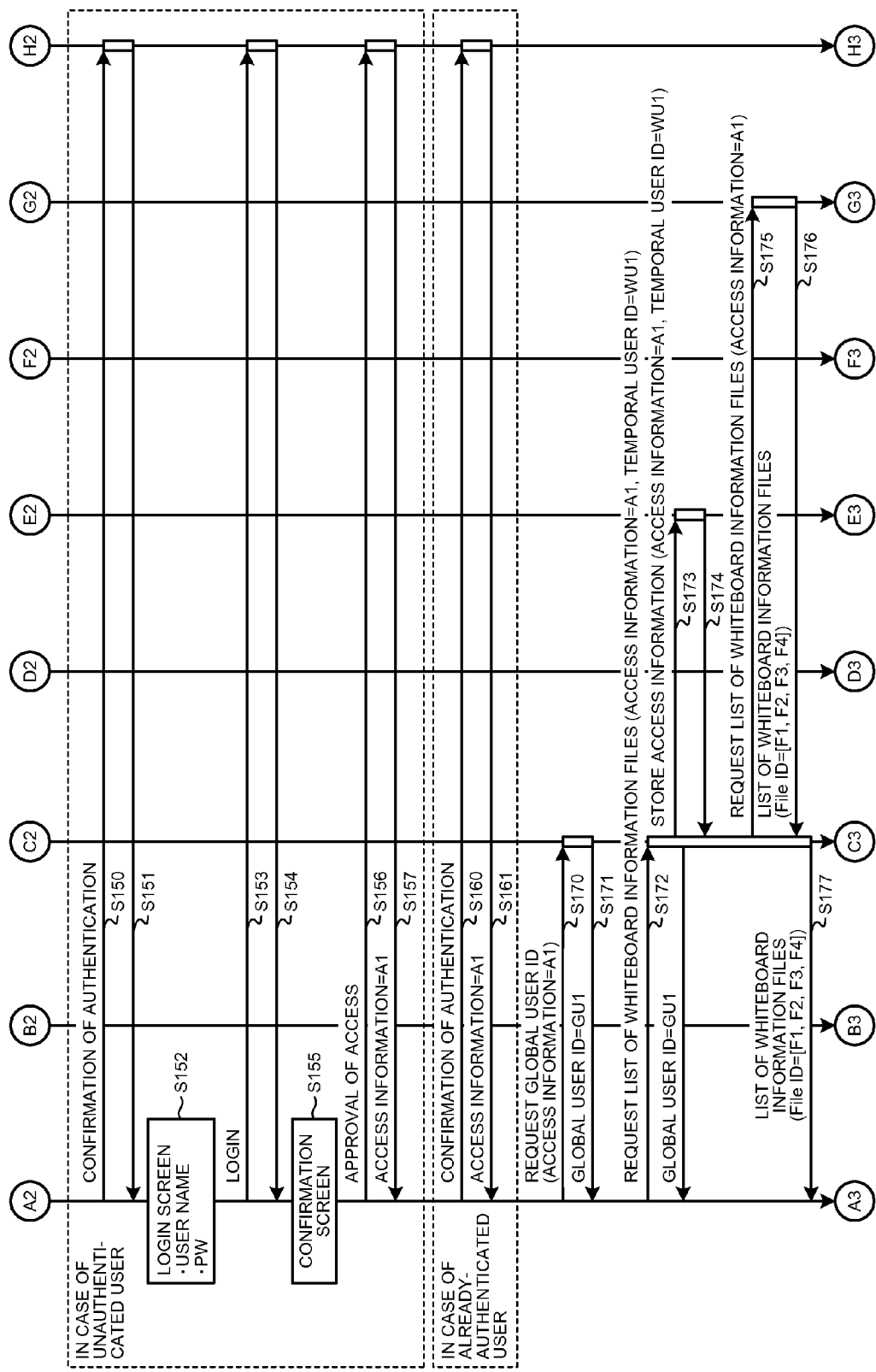
FIG. 8 is a sequence diagram illustrating an example of a process according to the embodiment.

Move on to FIG. 8. The remote control app 200 accesses the storage service 40 via the Internet 50. Here, when the user has not been authenticated by the storage service 40, the remote control app 200 first has to perform an authentication process with respect to the authentication service 41. In the embodiment, OAuth in widespread use on the Internet 50 is used in user authentication. The OAuth is a technology for securely handing over the user authority under the user's agreement among services that have built a trusting relationship in advance.

When the user has not been authenticated, the remote control app 200 communicates with the authentication service 41 via the Internet 50, and requests the storage service 40 for confirmation of authentication (Step S150).

Figure 24:
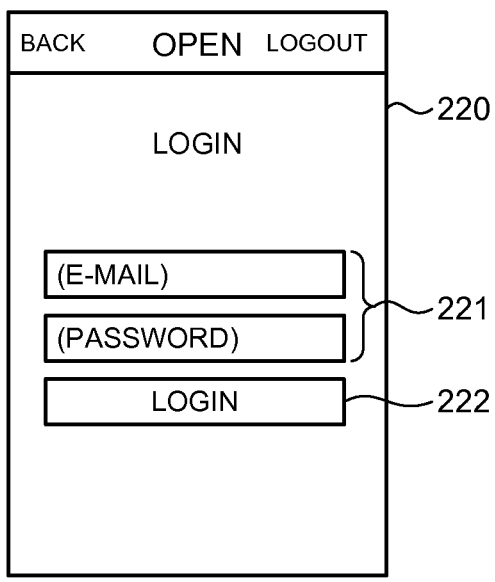
FIG. 24 is a diagram illustrating an example of a display screen of the terminal according to the embodiment.

The authentication service 41 transmits a response to the request to the remote control app 200 (Step S151). In accordance with this response, the remote control app 200 causes the display unit 2007 to display a login screen (Step S152). FIG. 24 shows an example of a login screen 220. A login-information entry section 221 and a LOGIN button 222 are set up in the login screen 220. Login information acquired to use an account of the storage service 40 is input to the login-information entry section 221. In this example, user identifying information (in this example, an e-mail address) and a password are input as login information. When the user has input these pieces of information to the login-information entry section 221 and operated the LOGIN button 222, the input login information is transmitted from the remote control app 200 to the authentication service 41 (Step S153).

Figure 25:
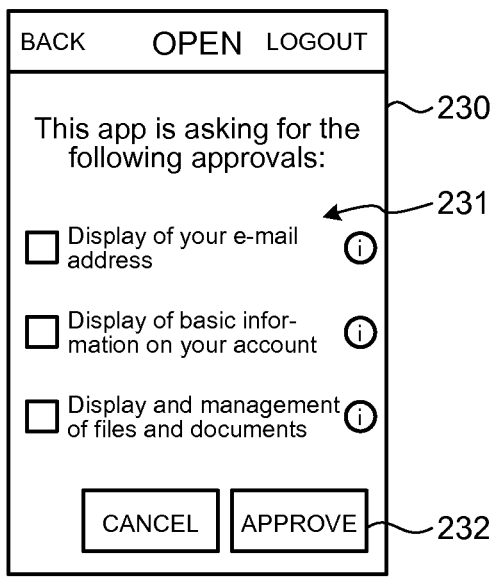
FIG. 25 is a diagram illustrating an example of a display screen of the terminal according to the embodiment.
Figure 26A:
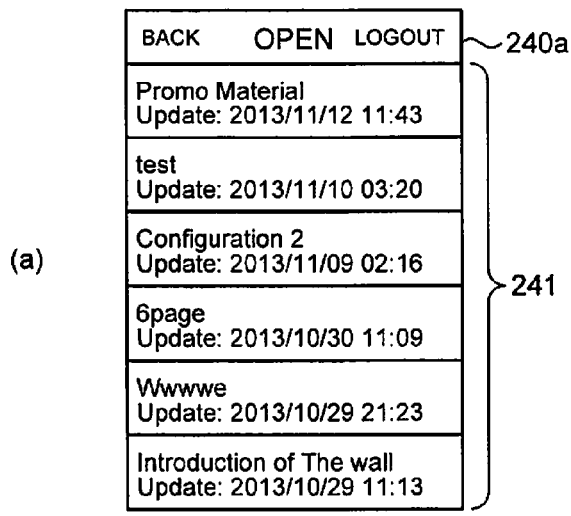
FIGS. 26(a), 26(b), and 26(c) are diagrams illustrating an example of a display screen of the terminal according to the embodiment.
Figure 26B:
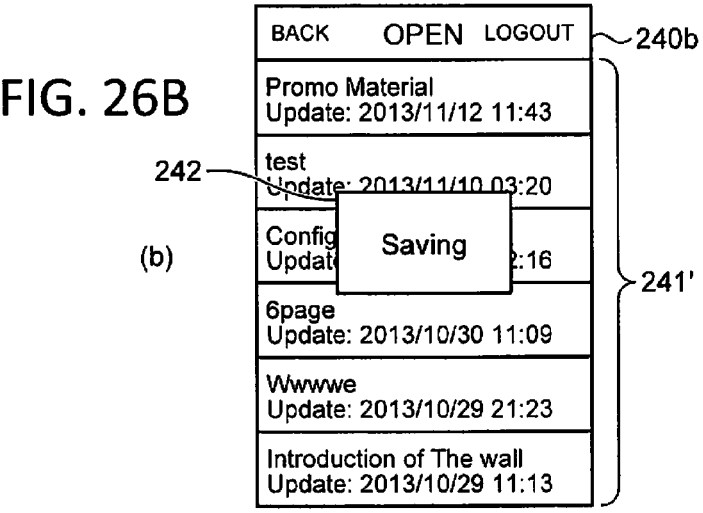
Figure 26C:
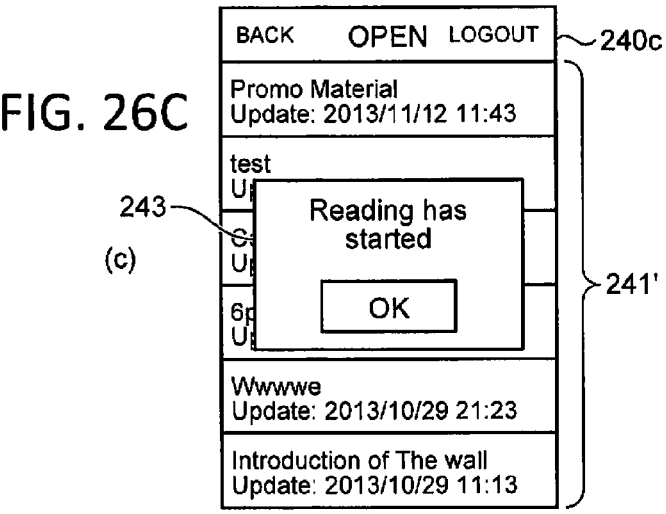

When having received the login information, the authentication service 41 transmits confirmation information to the remote control app 200 (Step S154). In accordance with the received confirmation information, the remote control app 200 causes the display unit 2007 to display a confirmation screen 230 illustrated in FIG. 25 (Step S155). In FIG. 25, confirmation items 231 and an APPROVE button 232 for having approval on each confirmation item 231 are displayed on the confirmation screen 230. When the user has operated the APPROVE button 232, the remote control app 200 transmits a request for approval of access to the storage service 40 to the authentication service 41 (Step S156).

When the authentication service 41 has given approval of access in response to this request, the authentication service 41 transmits access information (A1) for permitting use of a storage area of the storage service 40 to the remote control app 200. This access information=A1 is a token for the authenticated user to use a storage area of the storage service 40, and the user can use the storage area of the storage service 40 by using the access information=A1 without performing an authentication process each time.

On the other hand, when the user has already been authenticated by the storage service 40, as shown in Steps S160 and S161, the above-described login process at Steps S151 to S156 is omitted, and only request to the authentication service 41 for confirmation of authentication and transmission of access information=A1 from the authentication service 41 in response to the request are performed.

When the remote control app 200 has acquired the access information=A1 through the authentication process, the remote control app 200 transmits the access information=A1 to the server application 301 and requests a global user ID from the server application 301 (Step S170). The server application 301 generates a global user ID on the basis of the access information=A1 transmitted from the remote control app 200. This global user ID is unique information for the user, and is associated with the access information=A1 on a one-to-one basis. Here, the server application 301 generates global user ID=GU1 with respect to the access information=A1. The server application 301 transmits the generated global user ID=GU1 to the remote control app 200 (Step S171).

At the next Step S172, the remote control app 200 transmits the access information=A1 and temporal user ID=WU1 to the server application 301, and requests a list of whiteboard information files from the server application 301. The server application 301 stores the access information=A1 and temporal user ID=WU1 transmitted from the remote control app 200 in the access-information management DB 303 with the temporal user ID=WU1 as key information and the access information=A1 as a value (Step S173).

When the server application 301 has received a notification of completion of storing of the access information=A1 and the temporal user ID=WU1 from the access-information management DB 303 (Step S174), at the next Step S175, the server application 301 transmits the access information=A1 to the storage service 40, and requests a list of whiteboard information files stored in a storage area of the storage service 40 corresponding to the access information=A1 from the storage service 40. The storage service 40 retrieves whiteboard information files stored in the storage area based on the access information=A1, and transmits the retrieved whiteboard information files to the server application 301 (Step S176). The server application 301 receives the list of whiteboard information files transmitted from the storage service 40, and transmits the list of whiteboard information files to the remote control app 200. Here, the list of whiteboard information files includes four files identified by file ID=F1, F2, F3, and F4 (Step S177).

A whiteboard information file includes information of the drawing area 1010 of a whiteboard, i.e., the IWB 10. FIG. 19 shows the data structure of an example of a whiteboard information file. FIG. 20 shows an example of a data string included in the whiteboard information file. In the embodiment, the whiteboard information file is written by using JSON (JavaScript Object Notation; JavaScript is a registered trademark)).

In FIG. 19, items of "whiteboardId" and "whiteboardName" indicate an ID and name of a whiteboard. The item of "whiteboardId" is written by using a randomly-generated character string as illustrated in FIG. 20, where the probability of a duplicate value is reduced to very low. An item of "files" indicates that the layout of page data is described subsequently, and an item of "pageId" indicates a page ID. Just like the item of "whiteboardId", the page ID is written by using a randomly-generated character string as illustrated in FIG. 20 so that there is no duplicate value.

An item of "thumbnails" indicates that the layout of information of a thumbnail image pasted on a page indicated the item of "pageId" is described subsequently. An item of "pageId" subsequent to the item of "thumbnails" indicates a page ID of a link from the thumbnail image. Items of "x", "y", "w", and "h" indicate the x-coordinate, y-coordinate, width, and height of the thumbnail image, respectively.

Figure 9:
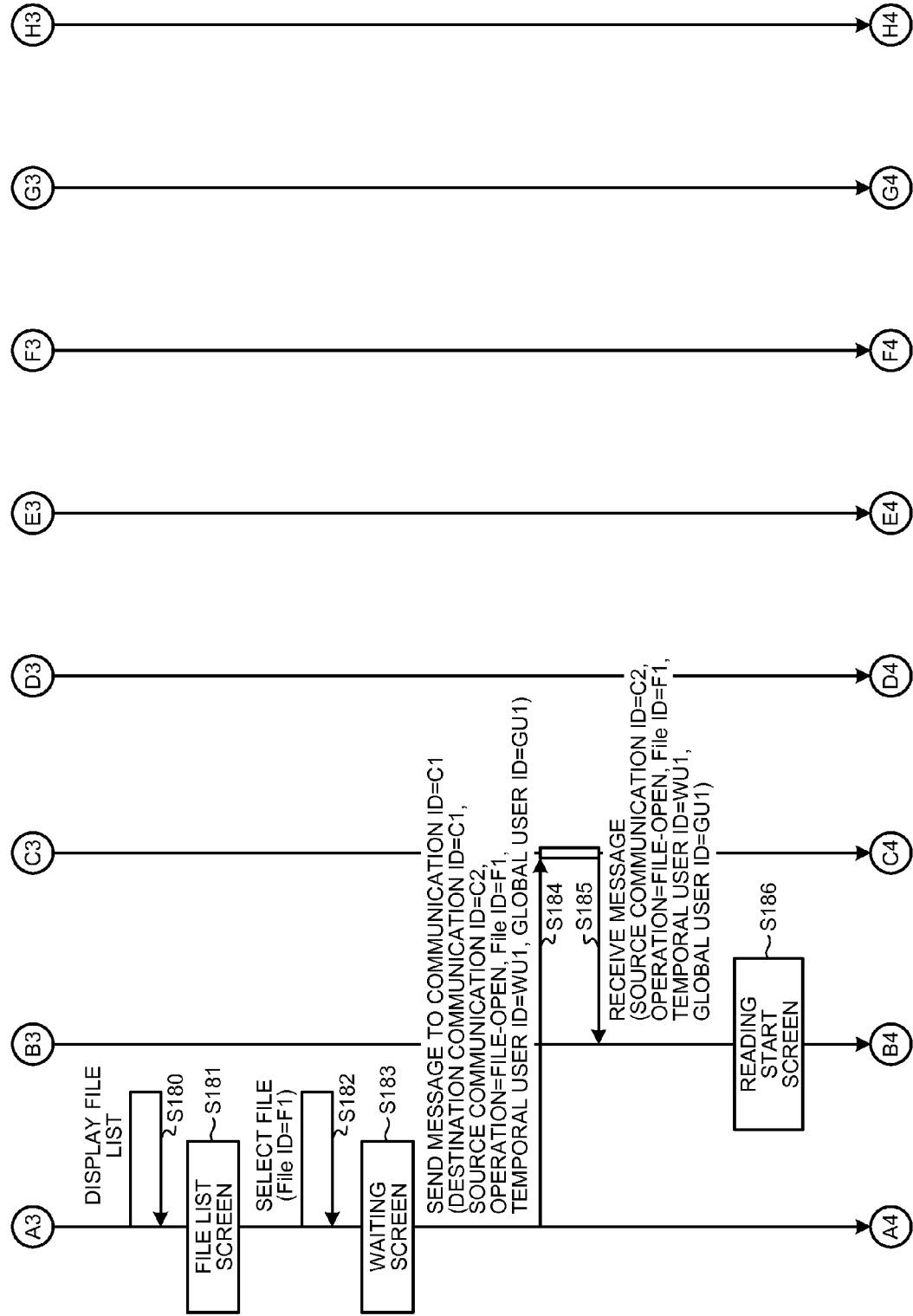
FIG. 9 is a sequence diagram illustrating an example of a process according to the embodiment.

Move on to FIG. 9. When the remote control app 200 has received the list of whiteboard information files from the server application 301 at Step S176, the remote control app 200 causes the display unit 2007 to display the list (Step S180) to display a file list screen 240a illustrated in FIG. 26(a) on the terminal 20 (Step S181). The remote control app 200 displays a list of whiteboard names on a display area 241 of the file list screen 240a.

When the user has tapped an intended whiteboard name displayed on the file list screen 240a, the remote control app 200 starts acquiring a selected file (Step S182). Here, a file with file ID=F1 is selected. At Step S183, the remote control app 200 displays a waiting screen 240b shown in FIG. 26(b), which is for waiting until the selected file has been acquired, on the terminal 20. In an example of FIG. 26B, an acquisition waiting display 242 is displayed on the waiting screen 240b in a manner overlapped with a display area 241' with a paled file list displayed.

The remote control app 200 transmits a message "destination communication ID=C1, source communication ID=C2, operation=FILE-OPEN, File ID=F1, temporal user global user ID=GU1" to be sent to a destination to communicate indicated by the communication ID=C1 to the server application 301 (Step S184). When the server application 301 has received this message, the server application 301 sends a message "source communication ID=C2, operation=FILE-OPEN, File ID=F1, temporal user ID=WU1, global user ID=GU1" addressed to the destination communication ID=C1 included in the message to the Internet 50 (Step S185).

The IWB application 101 polls the server application 301; therefore, when having detected that the message to the destination communication ID=C1 has been sent from the server application 301, the IWB application 101 receives the message. When having received the message, the IWB application 101 displays a screen shown in FIG. 26(c), which is for showing that reading of the whiteboard information file has started, on the drawing area 1010 (Step S186).

Figure 10:
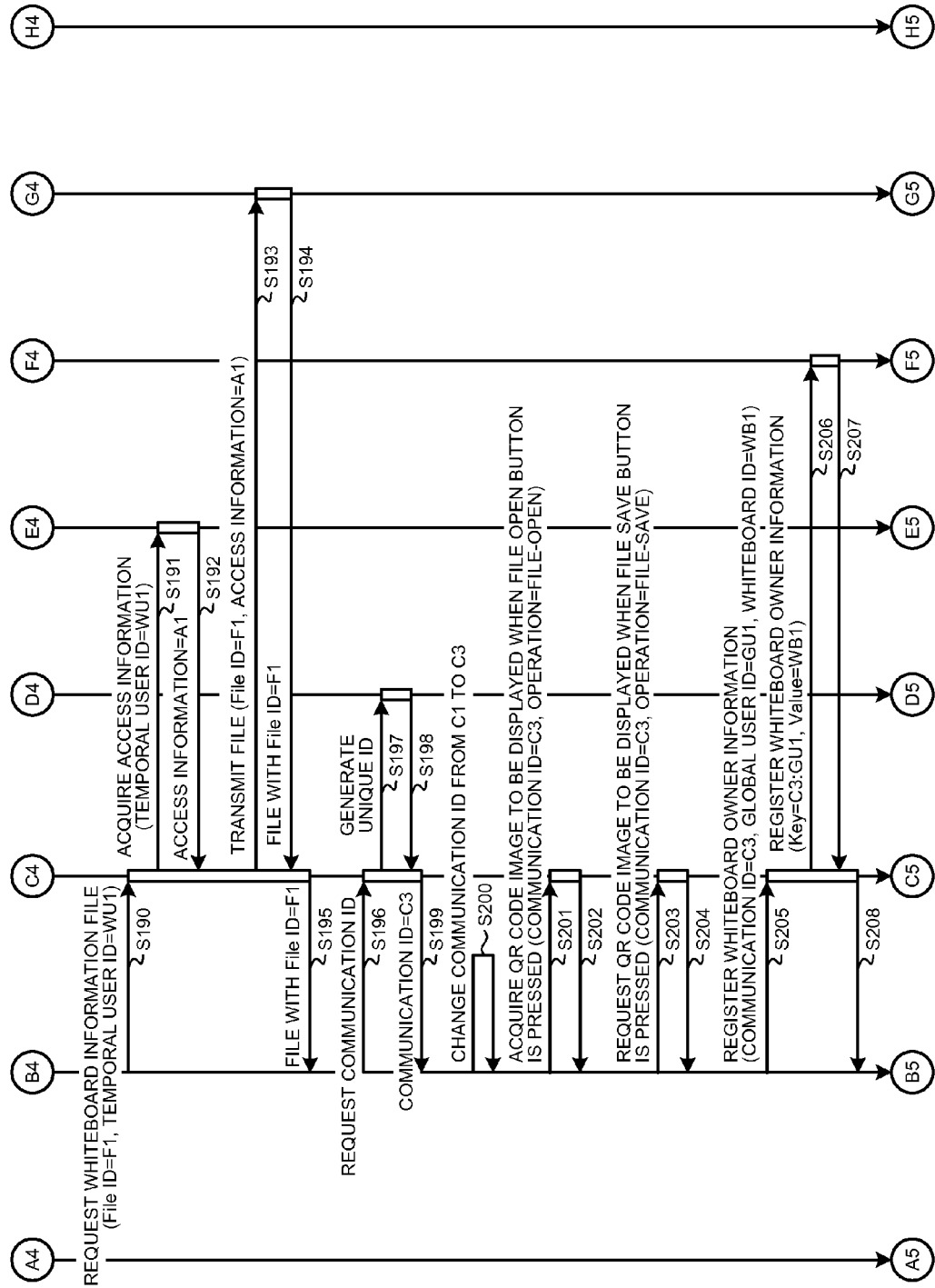
FIG. 10 is a sequence diagram illustrating an example of a process according to the embodiment.

Move on to FIG. 10. The IWB application 101 transmits the file ID=F1 and temporal user ID=WU1 included in the message to the server application 301, and requests the whiteboard information file with file ID=F1 from the server application 301 (Step S190). In response to this request, the server application 301 acquires access information=A1 associated with the temporal user ID=WU1 from the access-information management DB 303 (Steps S191 and S192). The server application 301 transmits the acquired access information=A1 and the file ID=F1 to the storage service 40 (Step S193). The storage service 40 retrieves a file corresponding to the file ID=F1 from a storage area corresponding to the access information=A1, and transmits the retrieved file to the server application 301 (Step S194). The server application 301 transmits the whiteboard information file corresponding to the file ID=F1 transmitted from the storage service 40 to the IWB application 101 (Step S195).

At Step S196, the IWB application 101 requests a communication ID from the server application 301. In response to the request from the IWB application 101, the server application 301 generates a unique communication ID (Steps S197 and S198). Here, communication ID=C3 generated. The generated communication ID is transmitted from the server application 301 to the IWB application 101 (Step S199). The IWB application 101 changes the communication ID from C1 to C3 (Step S200).

At the next Step S201, the IWB application 101 transmits the communication ID (=C3) and a file open command to the server application 301, and requests an encoded image displayed when a file open operation is performed from the server application 301 (Step S201). In response to this request, the server application 301 generates an encoded image including the communication ID and the file open command. The generated encoded image is transmitted from the server application 301 to the IWB application 101 (Step S202).

At the next Step S203, the IWB application 101 transmits the communication ID (=C3) and a file save command to the server application 301, and requests an encoded image displayed when a file save operation is performed from the server application 301 (Step S203). In response to this request, the server application 301 generates an encoded image including the communication ID and the file save command. The generated encoded image is transmitted from the server application 301 to the IWB application 101 (Step S204).

At the next Step S205, the IWB application 101 transmits a message "communication ID=C3, global user ID=GU1, whiteboard ID=WB1" to the server application 301, and requests the server application 301 to register whiteboard owner information. In response to this request, the server application 301 stores the global user ID=GU1 as a key and the whiteboard ID=WB1 as a value in the owner-information management DB 304 in a manner associated with each other (Steps S206 and S207). When having completed the storing, the server application 301 notifies the IWB application 101 of this (Step S208).

Figure 11:
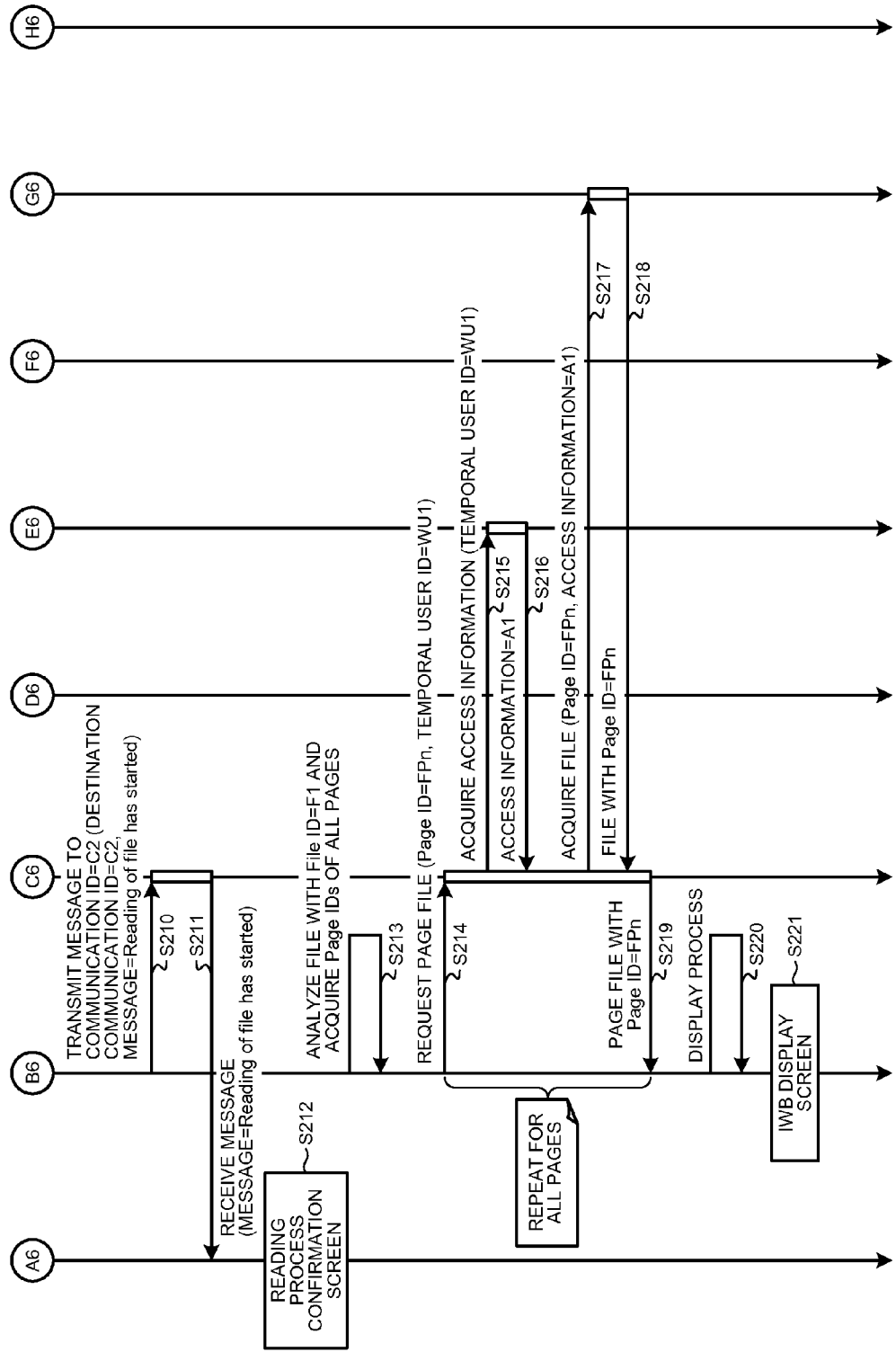
FIG. 11 is a sequence diagram illustrating an example of a process according to the embodiment.

Move on to FIG. 11. At Step S210, the IWB application 101 transmits a message including destination communication ID=C2 and a message that reading of file has started to the server application 301. This message is transmitted to the Internet 50 (Step S211). This message is received by the remote control app 200 with communication ID=C2. In accordance with the received message, the remote control app 200 displays a reading process confirmation screen 240c containing a reading process confirmation display 243 illustrated in FIG. 26C on the terminal 20 (Step S212).

Furthermore, the IWB application 101 analyzes the whiteboard information file with file ID=F1 acquired at Step S195, and acquires page IDs of all pages (Step S213). Then, in accordance with the acquired page IDs, the IWB application 101 transmits a message "Page ID=FPn, temporal user ID=WU1" to the server application 301, and requests a page file from the server application 301 (Step S214).

In response to this request, the server application 301 transmits the temporal user ID=WU1 to the access-information management DB 303, and acquires access information=A1 corresponding to the temporal user ID=WU1 (Steps S215 and S216). The server application 301 transmits the acquired access information=A1 and the page ID=FPn transmitted from the IWB application 101 to the storage service 40, and acquires a file corresponding to the page ID=FPn from the storage service 40 (Steps S217 and S218). The acquired file corresponding to the page ID=FPn is transmitted to the IWB application 101 (Step S219).

The above-described processes at Steps S214 to S219 are repeatedly performed until files of the all pages obtained through the analysis of the whiteboard information file with file ID=F1 at Step S213 have been acquired.

The IWB application 101 performs a process of displaying the page file acquired at Steps S214 to S219 on the drawing area 1010 (Step S220). Accordingly, an image read out from the storage area of the storage service 40 is displayed on the drawing area 1010 of the IWB 10 as illustrated in FIG. 27 (Step S221).

Figure 27:
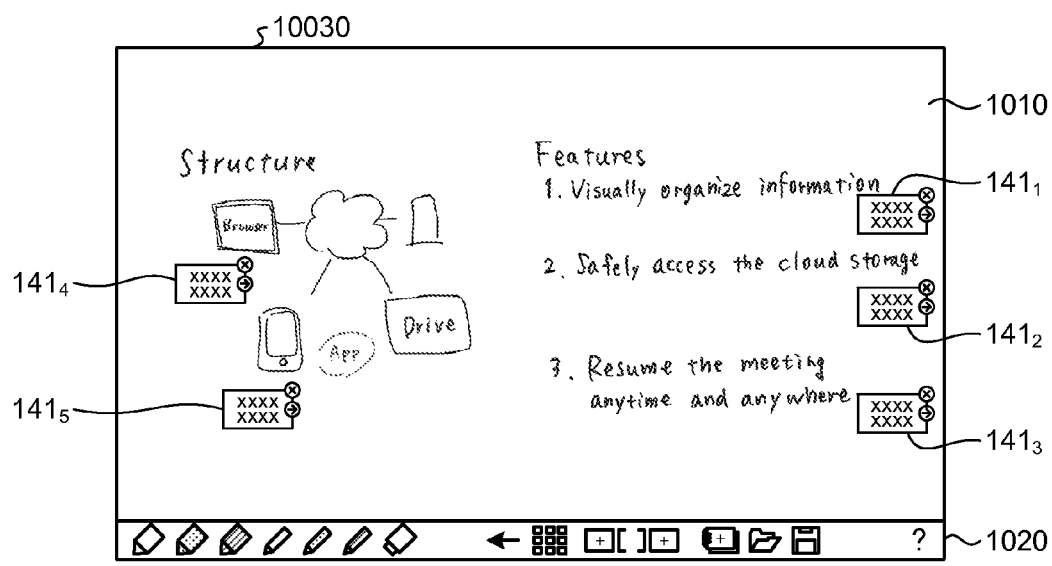
FIG. 27 is a diagram illustrating an example where an image read out from a storage service is displayed on a drawing area of the IWB.

Incidentally, thumbnail images $141_1$ to $141_5$ are displayed on the drawing area 1010 illustrated in FIG. 27. These thumbnail images $141_1$ to $141_5$ are reduced images of other pages, and present links to the other pages. That is, by tapping any of the thumbnail images $141_1$ to $141_5$, the display of the drawing area 1010 can be switched to the display of a page indicated by the thumbnail image.

File Overwriting Process

Figure 12:
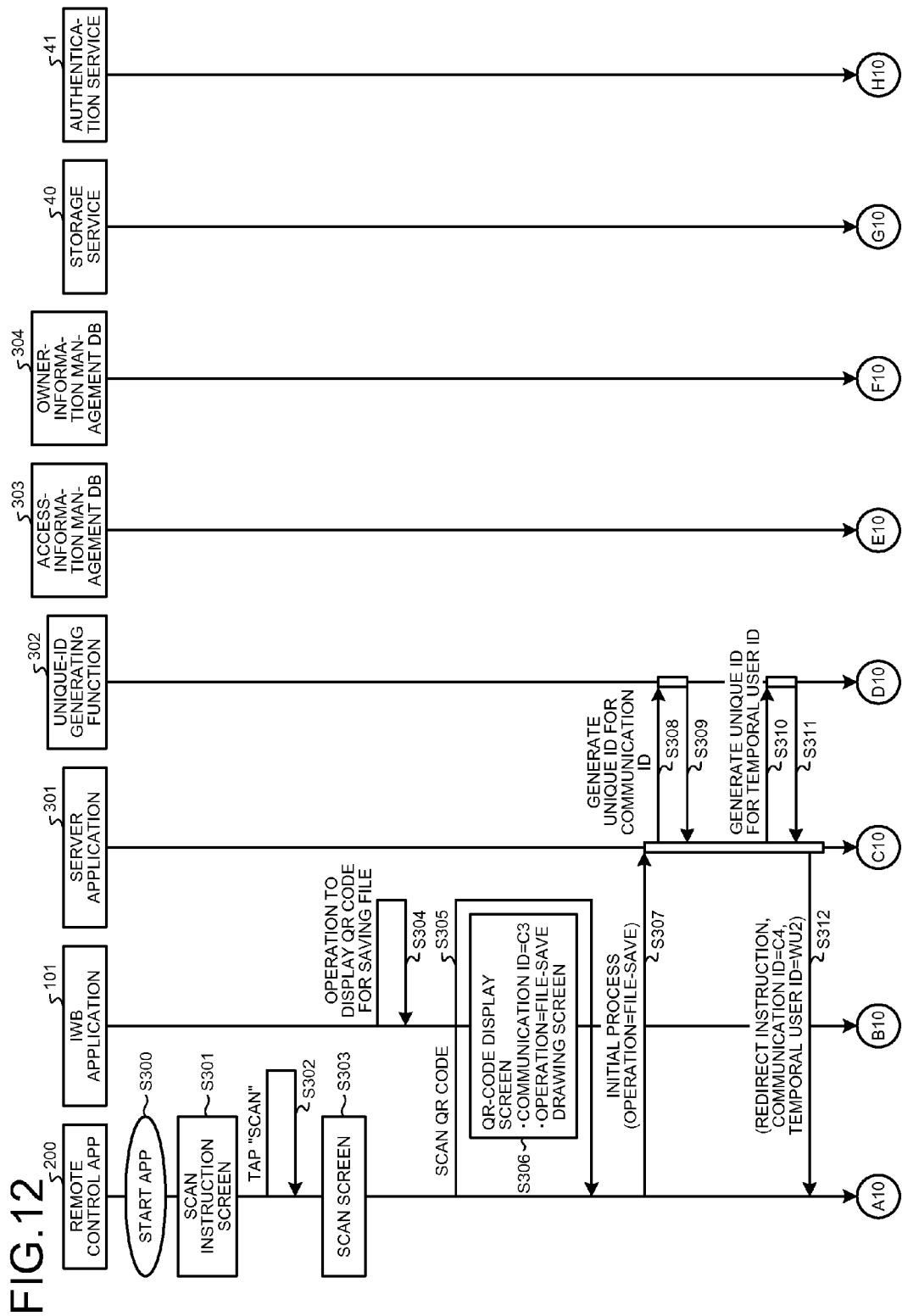
FIG. 12 is a sequence diagram illustrating an example of a process according to the embodiment.

Subsequently, there is explained a process of overwriting a file already stored in the storage service 40. As shown in FIG. 12, in the terminal 20, when the remote control app 200 has been started at Step S300, the remote control app 200 causes the display unit 2007 to display the scan instruction screen 2000 illustrated in FIG. 23A, which is for scanning an encoded image displayed on the IWB 10 (Step S301).

Figure 23B:
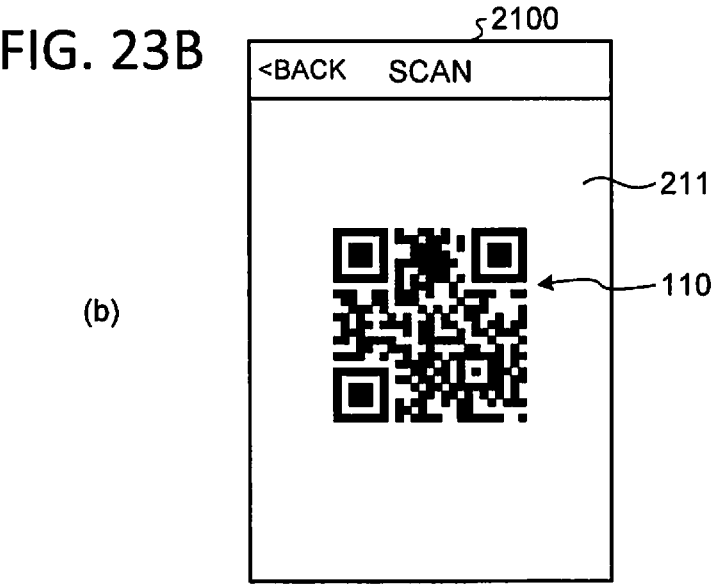

When the scan instruction section 201 with "scan" displayed has been tapped by the user (Step S302), the remote control app 200 controls the imaging unit 2003 to start imaging, and causes the display unit 2007 to display the scan screen 2100 illustrated in FIG. 23(b) (Step S303).

Figure 28:
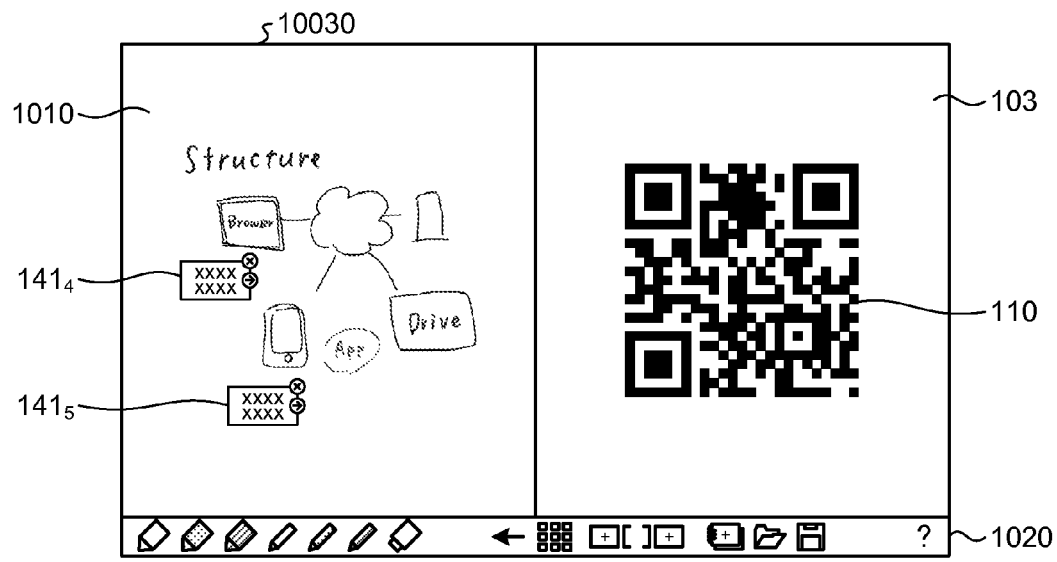
FIG. 28 is a diagram illustrating an example where an encoded-image display area is displayed to be overlapped with the drawing area on which an image has been displayed according to the embodiment.

Furthermore, the user operates the icon 1027 on the menu bar 102 of the IWB 10 to instruct the IWB application 101 to overwrite a file (Step S304). In response to this instruction, the IWB application 101 displays the encoded image 110 including the file save command acquired at the above-described Steps S117 and S118 on the encoded-image display area 103 (Step S306). At this time, the IWB application 101 displays the encoded-image display area 103 to be overlapped with the drawing area 1010 on which, for example, the image in FIG. 27 read out from the storage service 40 has been displayed as illustrated in FIG. 28.

The user adjusts the imaging range so that the encoded image 110 displayed at Step S306 fits within the imaging area 211 with reference to the scan screen 2100. When the remote control app 200 has recognized the encoded image 110, the remote control app 200 scans and acquires the encoded image 110 as an image (Step S305). This encoded image 110 includes the communication ID=C3 changed at Step S200 and the file save command as shown in Step S306.

Incidentally, when the icon 1027 has been operated at Step S304, the IWB application 101 can acquire the encoded image 110 including the changed communication ID=C3 by performing the processes at Steps S117 and S118.

At the next Step S307, the remote control app 200 requests the server application 301 to perform an initial process according to the file save command. In response to this request, the server application 301 generates communication ID=C4 and temporal user ID=WU2 as unique IDs by using the unique-ID generating function 302 (Steps S308 to S311). The server application 301 transmits the generated communication ID=C4 and temporal user ID=WU2 to the remote control app 200 (Step S312).

Figure 13:
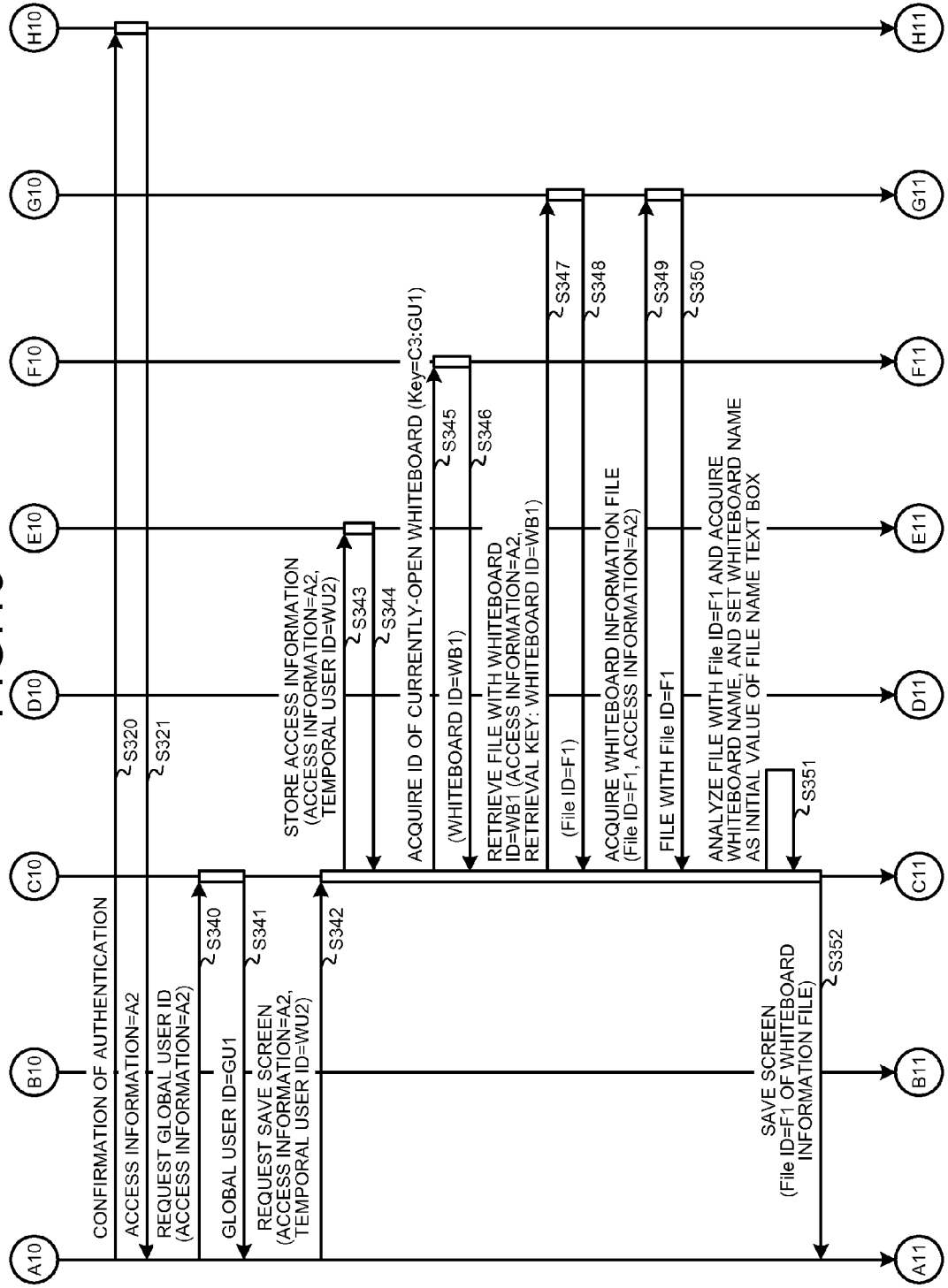
FIG. 13 is a sequence diagram illustrating an example of a process according to the embodiment.

Move on to FIG. 13. The remote control app 200 transmits a request for confirmation of authentication to the authentication service 41 (Step S320). In this case, the user has already been authenticated in the sequence of file open; therefore, the authentication service 41 transmits access information=A2 to the remote control app 200 (Step S321).

When the remote control app 200 has acquired the access information=A2, the remote control app 200 transmits the access information=A2 to the server application 301 and requests a global user ID from the server application 301 (Step S340). The server application 301 transmits global user ID=GU1 with respect to the access information=A2 transmitted from the remote control app 200 (Step S341).

The remote control app 200 transmits the access information=A2 and the temporal user ID=WU2 to the server application 301, and requests a save screen (Step S342). In response to this request, the server application 301 performs the processes at Steps S343 to S351.

That is, the server application 301 stores the access information=A2 and temporal user ID=WU2 transmitted from the remote control app 200 in the access-information management DB 303 (Steps S343 and S344). Then, the server application 301 searches the owner-information management DB 304 for the communication ID=C3 and the global user ID=GU1 as a key, and acquires an ID of a currently-open whiteboard (Steps S345 and S346). Here, the whiteboard ID=WB1 registered in the owner-information management DB 304 at the above-described Steps S206 and S207 is acquired.

The server application 301 accesses the storage service 40 by using the access information=A2, and retrieves a whiteboard information file with the acquired whiteboard ID=WB1 as a key (Step S347). As a result, the server application 301 acquires file ID=F1 of the currently-open whiteboard information file (Step S348). The server application 301 transmits the access information=A2 and the file ID=F1 to the storage service 40 (Step S349), and acquires the whiteboard information file with the file ID=F1 from the storage service 40 (Step S350). Then, the server application 301 analyzes the whiteboard information file with file ID=F1 and acquires a file name, and sets the acquired file name as an initial value of a text box (a file-name entry section) on the save screen (Step S351).

The server application 301 transmits information of the save screen in which the initial value of the file-name entry section has been set as described above to the remote control app 200 (Step S352).

Figure 14:
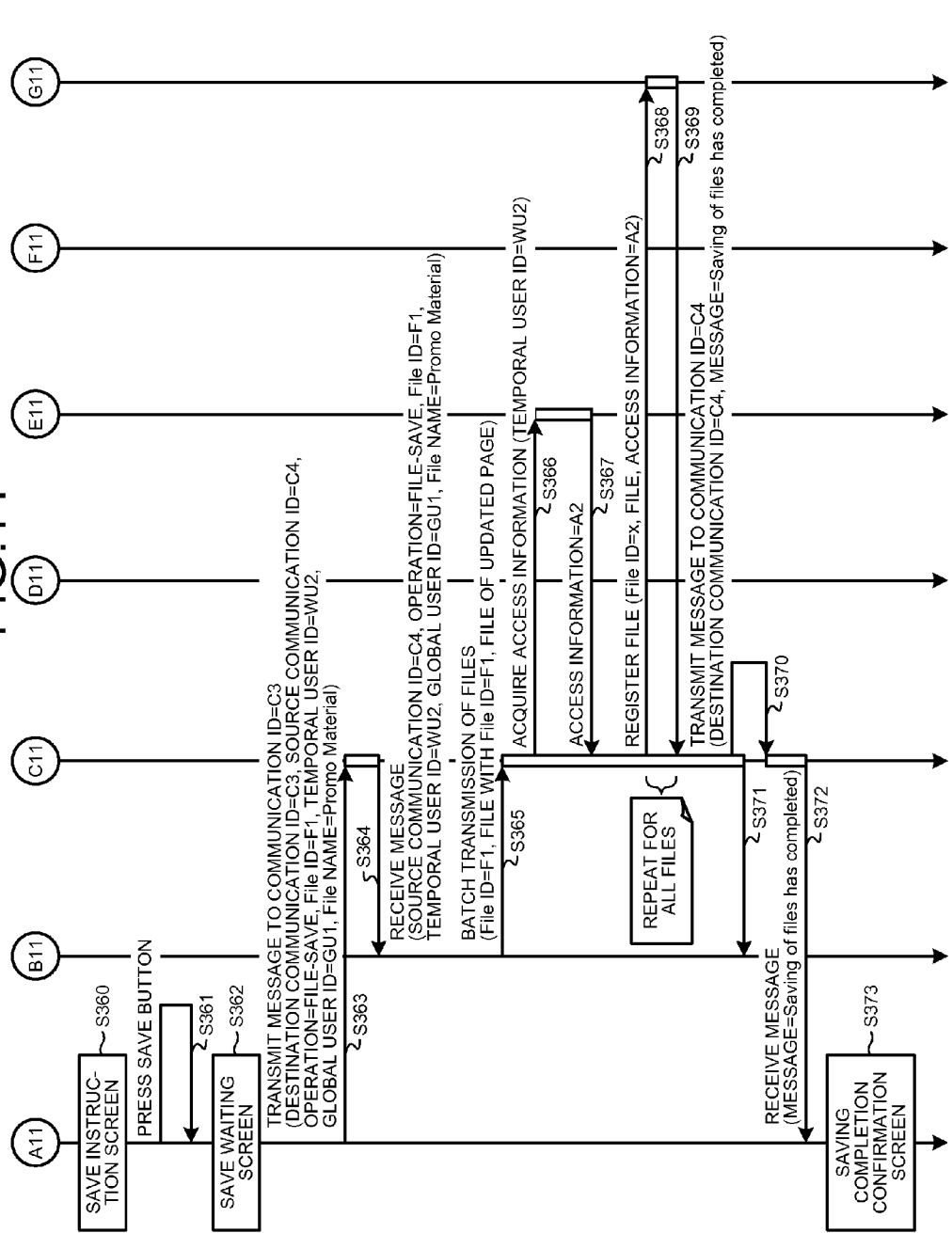
FIG. 14 is a sequence diagram illustrating an example of a process according to the embodiment.

Move on to FIG. 14. In accordance with the information of the save screen transmitted from the server application 301 at Step S352, the remote control app 200 causes the display unit 2007 of the terminal 20 to display a save screen 250a illustrated in FIG. 29(a) (Step S360). A file-name entry section 251, which is a text box for text entry, and a SAVE button 252 are set up in the save screen 250a. In the case of overwrite save, the file name (in this example, "Promo Material") set as the initial value at Step S351 is input to the file-name entry section 251 in advance.

Figure 29A:
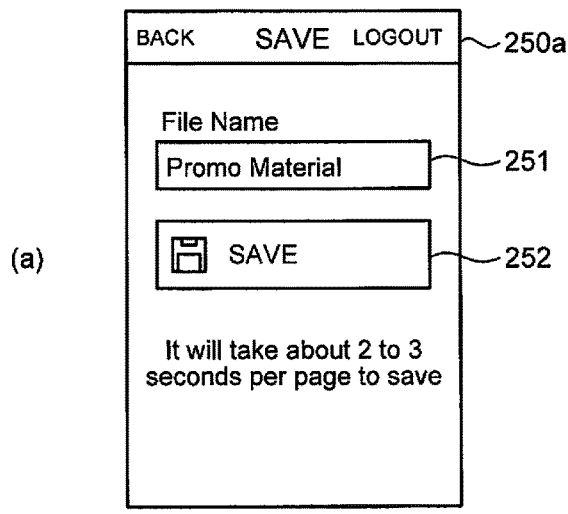
FIGS. 29(a), 29(b), and 29(c) are diagrams illustrating an example of a display screen of the terminal according to the embodiment.
Figure 29B:
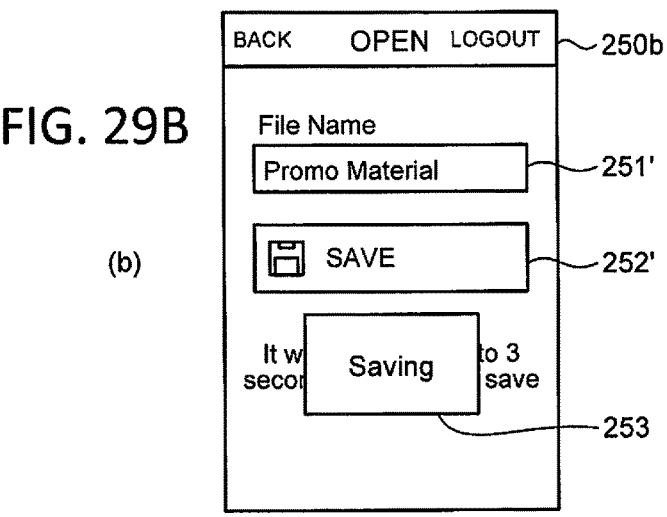
Figure 29C:
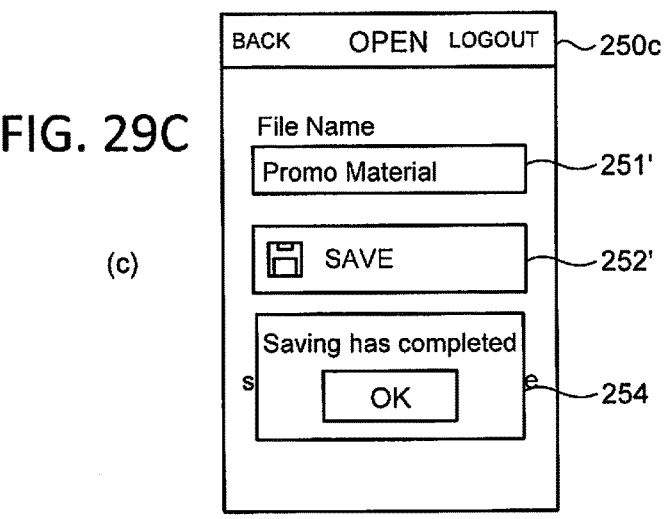
Figure 30:
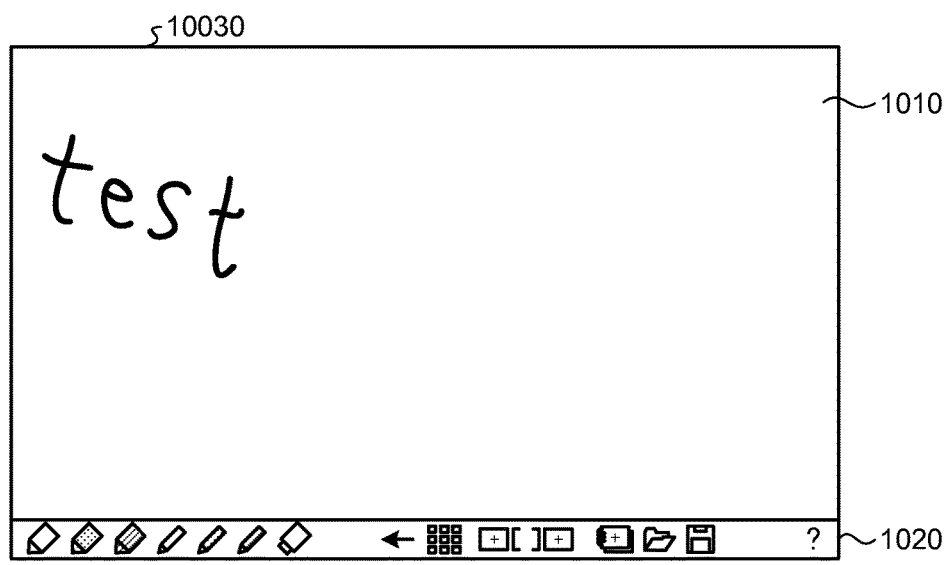
FIG. 30 is a diagram illustrating an example where a user has drawn characters on the drawing area of the IWB according to the embodiment.

When the SAVE button 252 has been tapped by the user (Step S361), the remote control app 200 causes the display unit 2007 of the terminal 20 to display a save waiting screen 250b illustrated in FIG. 29(b) (Step S362). In this example, on the save waiting screen 250b, a save waiting display 253 is displayed in a manner overlapped with a file-name entry section 251' and a SAVE button 252' that the file-name entry section 251 and the paled SAVE button 252 on the save screen 250a are paled out.

While the save waiting screen 250b is being displayed, the remote control app 200 transmits a message "destination communication ID=C3, source communication ID=C4, operation=FILE-SAVE, File ID=F1, temporal user ID=WU2, global user ID=GU1, File Name=Promo Material" addressed to the communication ID=C3 to the server application 301 (Step S363). When the server application 301 has received this message, the server application 301 sends a message "source communication ID=C4, operation=FILE-SAVE, File ID=F1, temporal user ID=WU2, global user ID=GU1, File Name=Promo Material" addressed to the destination communication ID=C3 included in the message to the Internet 50 (Step S364).

As described above, the IWB application 101 polls the server application 301; therefore, when having detected that the message to the destination communication ID=C3 has been sent from the server application 301, the IWB application 101 receives the message. When having received the message, the IWB application 101 transmits the file ID=F1, a whiteboard information file with the file ID=F1, and a file of an updated page to the server application 301, and requests batch transmission of files from the server application 301 (Step S365).

In response to this request, the server application 301 transmits the temporal user ID=WU2 to the access-information management DB 303 and acquires corresponding access information=A2 (Steps S366 and S367). The server application 301 transmits the acquired access information=A2, file ID=x transmitted from the IWB application 101, and a whiteboard information file indicated by the file ID=x to the storage service 40 to register these in the storage service 40 (Steps S368 and S369).

The above processes at Steps S368 and S369 are repeatedly performed until all files obtained through the analysis of the whiteboard information file with file ID=F1 at Step S351 have been processed (Step S371).

When all the files have been processed, the server application 301 transmits a message indicating the completion of saving of files to the remote control app 200 (Steps S370 and S372). In accordance with this message, the remote control app 200 causes the display unit 2007 of the terminal 20 to display a save completion screen 250c containing a save completion message 254 illustrated in FIG. 29(c) (Step S373).

Saving of New File

Figure 15:
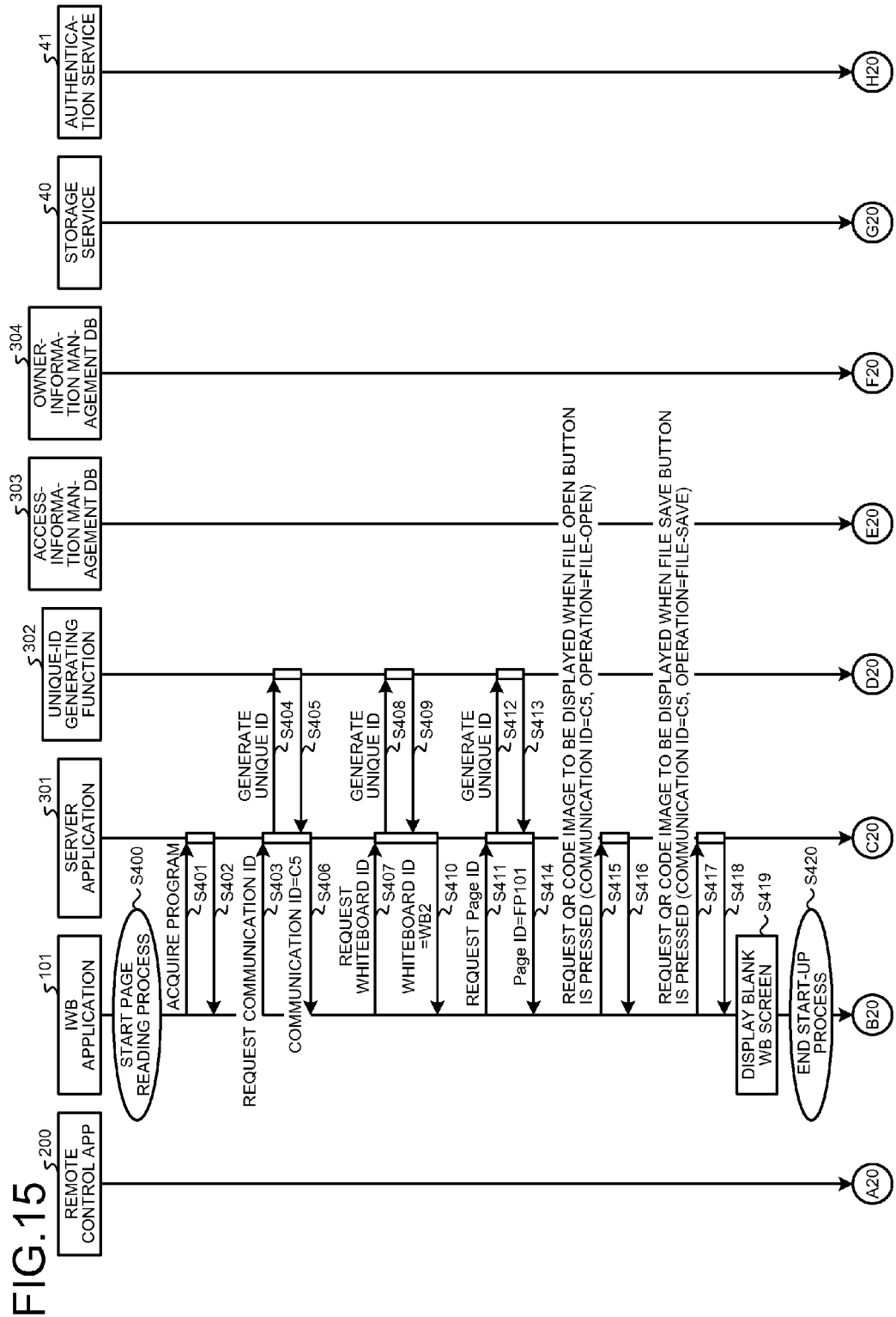
FIG. 15 is a sequence diagram illustrating an example of a process according to the embodiment.

Subsequently, there is explained a case where the IWB 10 saves an image on the drawing area 1010 as a new file to the storage service 40. In FIG. 15, when the IWB application 101 has started a page reading process (Step S400), the IWB application 101 acquires a program for performing operation according to the embodiment from the server device 30 (Steps S401 and S402).

At Step S403, the IWB application 101 requests a communication ID from the server application 301. The server application 301 generates a unique communication ID in response to the request from the IWB application 101 (Steps S404 and S405). Here, communication ID=C5 is generated. The generated communication ID is transmitted from the server application 301 to the IWB application 101 (Step S406).

At the next Step S407, the IWB application 101 requests a whiteboard ID from the server application 301. The server application 301 generates a unique whiteboard ID in response to the request from the IWB application 101 (Steps S408 and S409). Here, whiteboard ID=WB2 is generated. The generated whiteboard ID is transmitted from the server application 301 to the IWB application 101 (Step S410).

At the next Step S411, the IWB application 101 requests a Page ID from the server application 301. The server application 301 generates a unique Page ID in response to the request from the IWB application 101 (Steps S412 and S413). Here, Page ID=FP101 is generated. The generated Page ID is transmitted from the server application 301 to the IWB application 101 (Step S414).

At the next Step S415, the IWB application 101 transmits the communication ID (=C5) and a file open command ordering a file operation to open a file to the server application 301, and requests an encoded image to be displayed when the file open operation is performed from the server application 301. In response to this request, the server application 301 generates an encoded image including the communication ID and the file open command. The generated encoded image is transmitted from the server application 301 to the IWB application 101 (Step S416).

At the next Step S417, the IWB application 101 transmits the communication ID (=C5) and a file save command ordering a file operation to save a file to the server application 301, and requests an encoded image to be displayed when the file save operation is performed from the server application 301. In response to this request, the server application 301 generates an encoded image including the communication ID and the file save command. The generated encoded image is transmitted from the server application 301 to the IWB application 101 (Step S418).

At the next Step S419, the IWB application 101 causes the display unit 1003 to display a blank whiteboard screen on the display area 10030. Accordingly, the start-up process performed by the IWB application 101 to save a new file is terminated (Step S420).

Figure 16:
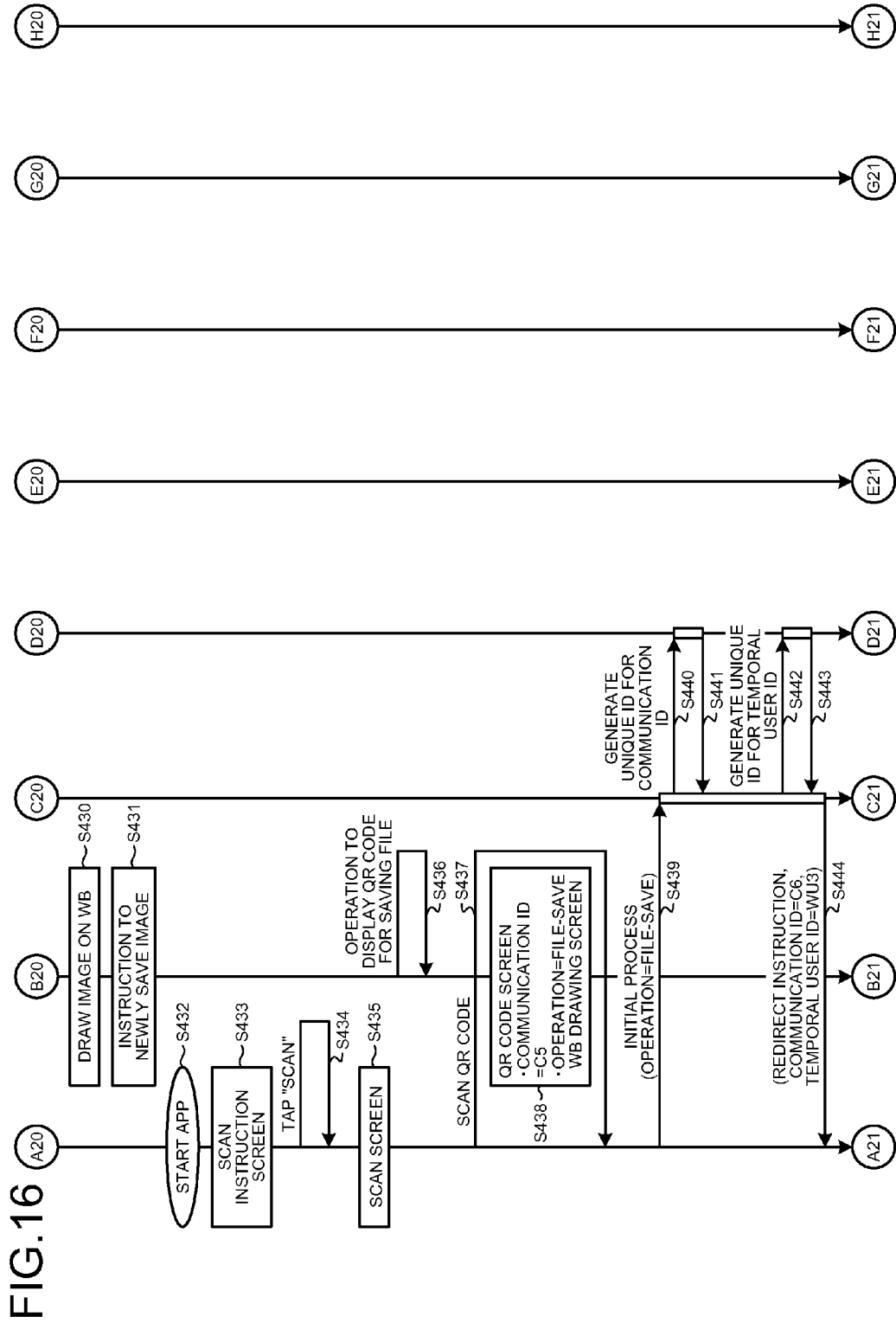
FIG. 16 is a sequence diagram illustrating an example of a process according to the embodiment.

Move on to FIG. 16. The user draws characters illustrated in FIG. 30 on the drawing area 1010 of the IWB 10 (Step S430), and operates the icon 1027 on the menu bar 1020 to instruct to newly save an image of the drawn characters (Step S431).

On the other hand, in the terminal 20, the remote control app 200 is started by the user (Step S432). The remote control app 200 causes the display unit 2007 to display the scan instruction screen 2000 illustrated in FIG. 23A (Step S433). When the scan instruction section 201 with "scan" displayed has been tapped by the user (Step S434), the remote control app 200 controls the imaging unit 2003 to start imaging, and causes the display unit 2007 to display the scan screen 2100 illustrated in FIG. 23B (Step S435).

Figure 31:
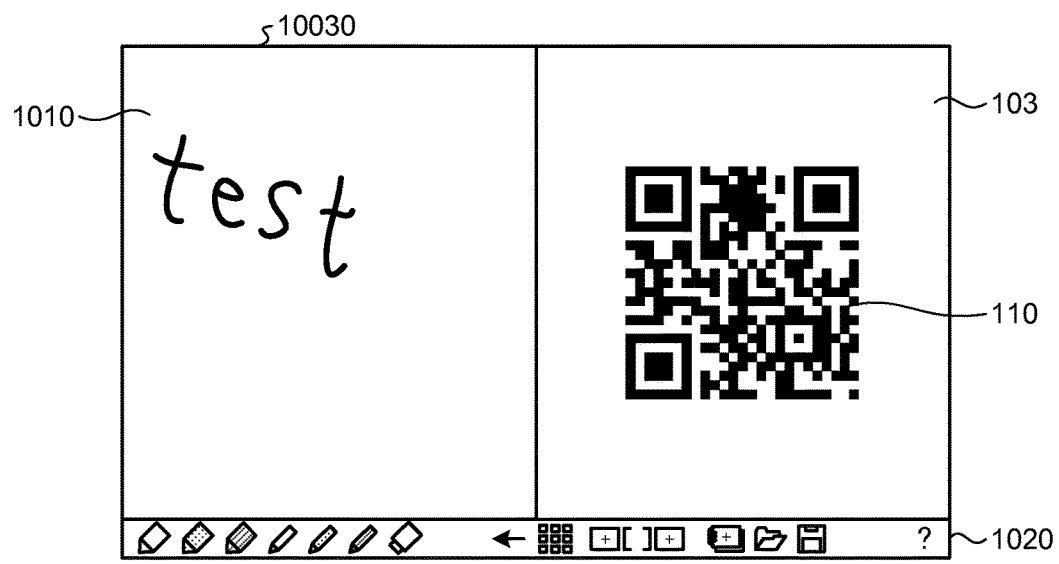
FIG. 31 is a diagram illustrating an example where the encoded image is displayed in the encoded-image display area in response to a newly save instruction according to the embodiment.

On the other hand, in response to the newly save instruction at Step S431, the IWB application 101 displays the encoded image 110 including the file open command acquired at Steps S417 and S418 on the encoded-image display area 103 as illustrated in FIG. 31 (Step S436).

The user adjusts the imaging range so that the encoded image 110 displayed at Step S136 fits within the imaging area 211 with reference to the scan screen 2100. When the remote control app 200 has recognized the encoded image 110, the remote control app 200 scans and acquires the encoded image 110 as an image (Step S437). This encoded image 110 includes the communication ID=C5 and the file save command as shown in Step S438.

At the next Step S439, the remote control app 200 communicates with the server application 301 and requests the server application 301 to perform an initial process according to the file save command. In response to this request, the server application 301 generates a communication ID and a temporal user ID as unique IDs for the remote control app 200 by using the unique-ID generating function 302 (Steps S440 to S443). The server application 301 transmits the generated communication ID (=C6) and temporal user ID (=WU3) to the remote control app 200 (Step S444). Furthermore, at this time, the server application 301 transmits an instruction to redirect to the storage service 40 to the remote control app 200.

Move on to FIG. 17. The remote control app 200 transmits a request for confirmation of authentication to the authentication service 41 (Step S450). In this case, the user has already been authenticated in the sequence of file open; therefore, the authentication service 41 transmits access information=A3 to the remote control app 200 (Step S451).

When the remote control app 200 has acquired the access information=A3, the remote control app 200 transmits the access information=A3 to the server application 301 and requests a global user ID from the server application 301 (Step S452). The server application 301 transmits global user ID=GU1 with respect to the access information=A3 transmitted from the remote control app 200 (Step S453).

At the next Step S454, the remote control app 200 transmits the access information=A3 and the temporal user ID=WU3 to the server application 301, and requests a save screen. The server application 301 stores the access information=A3 and temporal user ID=WU3 transmitted from the remote control app 200 in the access-information management DB 303 with the temporal user ID=WU3 as key information and the access information=A3 as a value (Steps S455 and S456).

Then, the server application 301 searches the owner-information management DB 304 for the communication ID=C5 and the global user ID=GU1 as a key, and acquires an ID of a currently-open whiteboard (Step S457). In this case, there is no corresponding whiteboard ID in the owner-information management DB 304; therefore, the server application 301 obtains a result that corresponding whiteboard ID was not found (Step S458).

The server application 301 sets an initial value of a text box (a file-name entry section) on the save screen to blank (a null character) (Step S459). The server application 301 transmits information of the save screen in which the initial value of the file-name entry section has been set to a null character as described above to the remote control app 200 (Step S460).

Figure 32A:
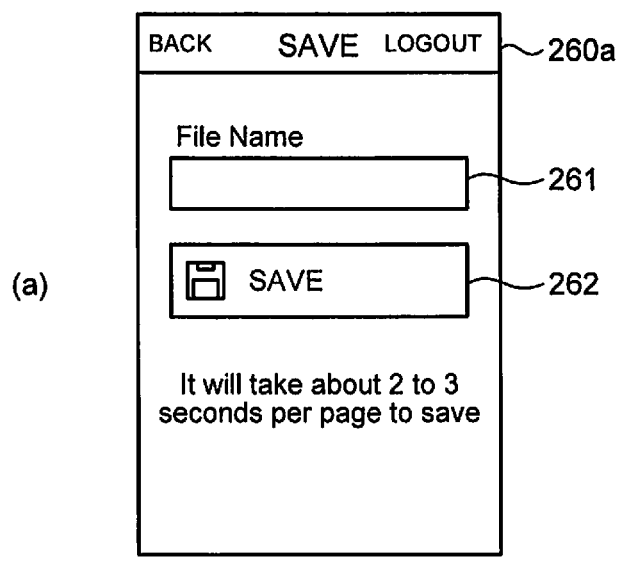
FIGS. 32(a) and 32(b) are diagrams illustrating an example of a display screen of the terminal according to the embodiment.
Figure 32B:
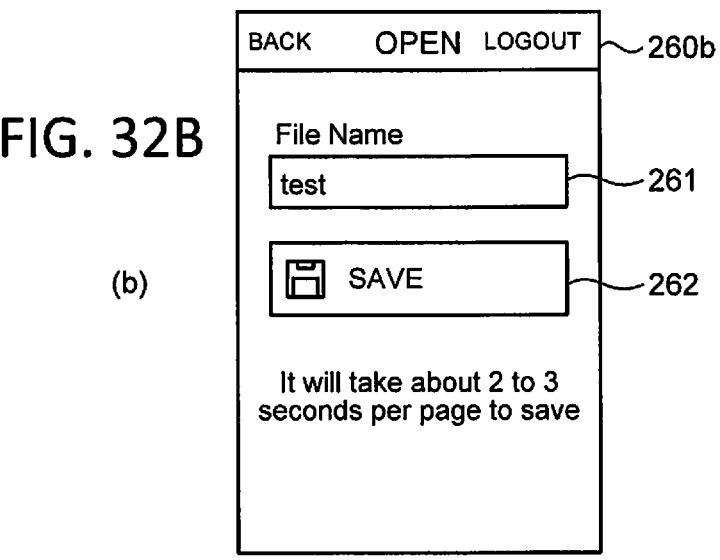

In accordance with the information of the save screen transmitted from the server application 301 at Step S460, the remote control app 200 causes the display unit 2007 of the terminal 20 to display a save screen 260a in which a blank file-name entry section 261 and a SAVE button 262 are set up as illustrated in FIG. 32(a) (Step S461). When the user has entered a file name (in this case, "test") in the file-name entry section 261 (Step S462), and the file name has been displayed as shown in FIG. 32B, the remote control app 200 waits until the SAVE button 262 is operated (Step S463). Then, when the SAVE button 262 has been operated by the user (Step S464), the save waiting screen 250b illustrated in FIG. 29B is displayed (Step S465).

Move on to FIG. 18. While the save waiting screen 250b is being displayed, the remote control app 200 transmits a message "destination communication ID=C5, source communication ID=C6, operation=FILE-SAVE, File ID=(N/A), temporal user ID=WU3, global user ID=GU1, File Name=test" addressed to the communication ID=C5 to the server application 301 (Step S470). When the server application 301 has received this message, the server application 301 sends a message "source communication ID=C6, operation=FILE-SAVE, File ID=(N/A), temporal user ID=WU3, global user ID=GU1, File Name=test" addressed to the destination communication ID=C5 included in the message to the Internet 50 (Step S471).

When the IWB application 101 has detected that the message to the destination communication ID=C5 has been sent from the server application 301 through polling, the IWB application 101 receives the message. When having received the message, the IWB application 101 creates whiteboard information file that includes information of the drawing area 1010 on which the image is drawn at Step 430, and that is explained using FIGS. 19 and 20 (Step S472). At the time, the IWB application 101 creates the whiteboard information file by using, as the whiteboard ID, a whiteboard ID acquired from the server application 301 at Step S410 and by using, as the whiteboard name, a file name included in the message received at Step S471. The IWB application 101 transmits the file ID=(N/A), a whiteboard information file created at Step S472, and files for all pages to the server application 301, and requests to transmit files at a lump from the server application 301 (Step S473).

In response to this request, the server application 301 transmits the temporal user ID=WU3 to the access-information management DB 303 and acquires corresponding access information=A3 (Steps S474 and S475). The server application 301 transmits the acquired access information=A3 and the whiteboard information file to the storage service 40 to register these in the storage service 40 (Steps S476 and S477).

The above processes at Steps S476 and S477 are repeatedly performed until the files for all pages on the IWB 10 have been processed (Step S479).

When all the files have been processed, the server application 301 transmits a message indicating the completion of saving of files to the remote control app 200 (Steps S478 and S480). In accordance with this message, the remote control app 200 causes the display unit 2007 of the terminal 20 to display the save completion screen 250c containing the save completion message 254 shown in FIG. 29(c) (Step S481).

At next Step S482, the IWB application 101 transmits a message "communication ID=C5, global user ID=GU1, whiteboard ID=WB2" to the server application 301, and requests the server application 301 to register whiteboard owner information. In response to this request, the server application 301 stores the global user ID=GU2 as a key and the whiteboard ID=WB2 as a value in the owner-information management DB 304 in a manner associated with each other (Steps S483 and S484). When having completed the storing, the server application 301 notifies the IWB application 101 of this (Step S485).

As described above, according to the embodiment, the terminal 20 transmits IWB identifying information acquired from the IWB 10 and access information acquired by the terminal 20 accessing the storage service 40 to the server device 30, and performs access from the IWB 10 to the storage service 40 through the server device 30. Therefore, it is not necessary to log in to the storage service 40 through the screen of the IWB 10, and it is possible to achieve secure access to the storage service 40.

Link from Thumbnail Image to Another Page

As described above, in the embodiment, the display can be switched to another page by using a thumbnail image of another page. The display switch using a thumbnail image is schematically explained with FIG. 33.

Figure 33A:
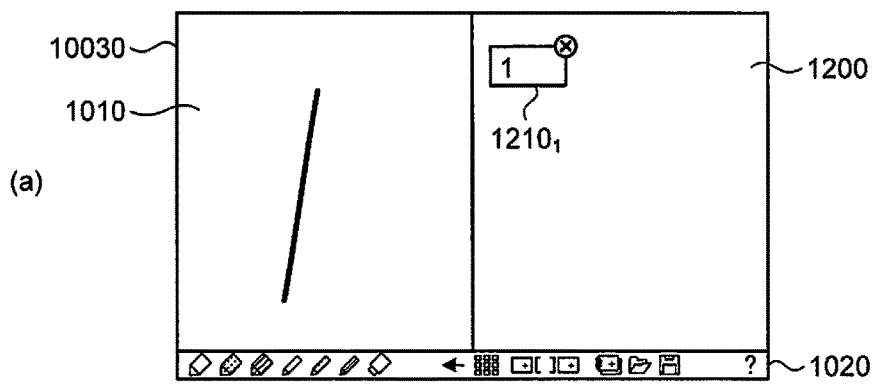
FIGS. 33(a), 33(b), 33(c), and 33(d) are diagrams for explaining display switch using a thumbnail image according to the embodiment.

As described above, in the IWB 10, by operating the icon 1024 on the menu bar 1020, a new page can be added onto the IWB 10. For example, in the case where the drawing area 1010 on which an image has been drawn is displayed, when the icon 1023 has been operated, as illustrated in FIG. 33(a), the IWB application 101 displays a thumbnail display area 1200 to be overlapped with the drawing area 1010 in the display area 10030, and displays a thumbnail image $1210_1$ of a page (a first page) currently displayed on the drawing area 1010 on the thumbnail display area 1200. In this example, a mark indicating a thumbnail image of a page currently displayed on the drawing area 1010 is added to the upper right corner of the thumbnail image $1210_1$.

Figure 33B:
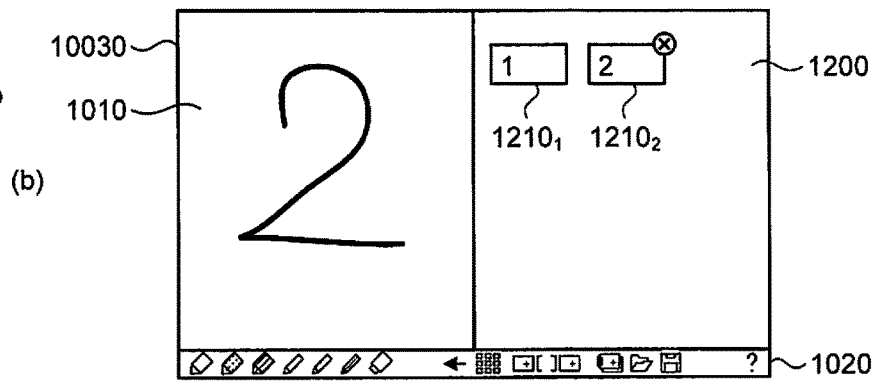

In this state, when the icon 1024 has been operated, the IWB application 101 creates a new page (a second page) additionally, and switches from the first page displayed on the drawing area 1010 to the second page to be displayed on the drawing area 1010. At this time, nothing has been drawn on the second page; therefore, the drawing area 1010 becomes a blank screen. Furthermore, as illustrated in FIG. 33(b), the IWB application 101 displays a thumbnail image $1210_2$ of the created second page on the thumbnail display area 1200 additionally. In the example of FIG. 33(b), an image has been drawn on the second page.

Figure 33C:
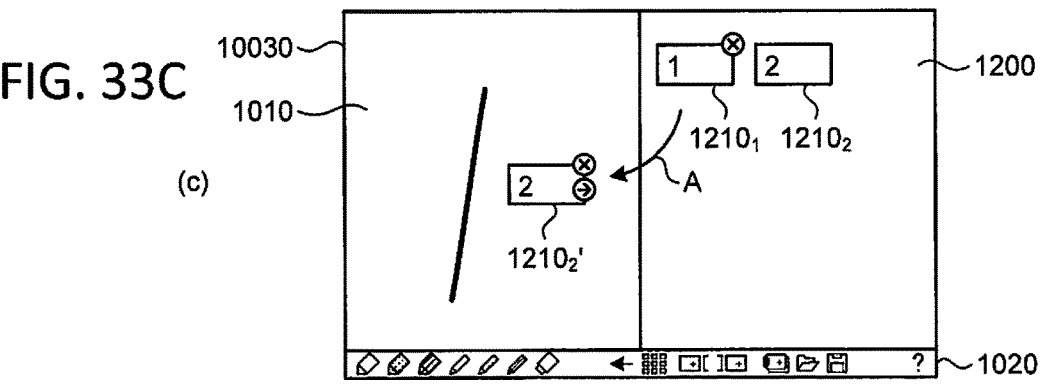
Figure 33D:
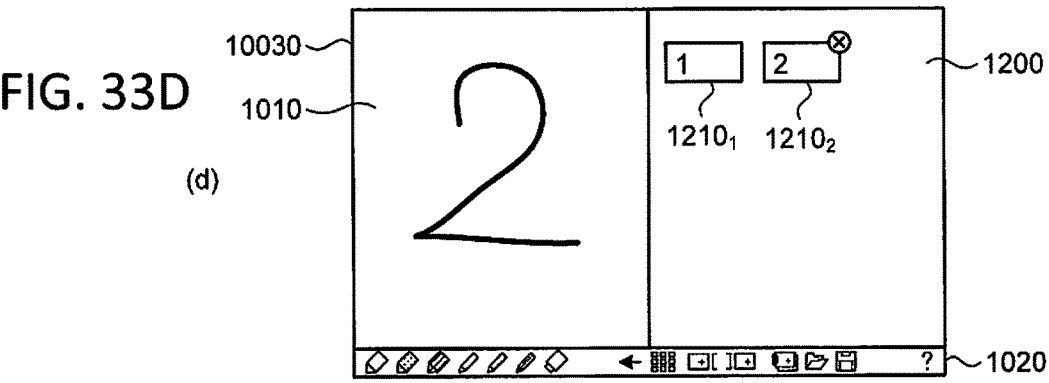

The thumbnail images $1210_1$ and $1210_2$ displayed on the thumbnail display area 1200 can each be placed into the drawing area 1010 by a drag-and-drop operation. That is, as illustrated in FIG. 33(c), for example, the thumbnail image $1210_2$ of the second page is moved to the drawing area 1010 with the first page displayed, for example, along a route A by a drag-and-drop (a thumbnail image $1210_2'$). Accordingly, the page displayed on the drawing area 1010 can be switched to the second page shown by the thumbnail image $1210_2$.

Incidentally, there is described above that the remote control app 200 acquires IWB identifying information (communication ID) by taking a picture of an encoded image displayed on the IWB 10; however, the way to acquire IWB identifying information is not limited to this example. For example, the remote control app 200 can acquire IWB identifying information from the IWB 10 by using Bluetooth (registered trademark)™ or the like.

According to the present invention, a storage service can be securely used through a screen that many users can share.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information sharing system, comprising:
an information processing system composed of one or more information processing apparatuses;
a terminal connected to the information processing system via a network; and
a display device connected to the information processing system via the network, the display device being equipped with a display on which an image is displayed, wherein
the display device includes a first identification-information acquiring unit, stored in a memory, that acquires identification information for identifying the display device on the network,
the terminal includes:
   a second identification-information acquiring unit, stored in a memory, that acquires the identification information from the display device;
   an access information acquiring unit, stored in a memory, that acquires access information used for accessing a storage service via the network, the access information being authenticated by an authentication service of the storage service in response to a request to access the storage service, the storage service and the authentication service are remote from the information processing system, the terminal, and the display device; and
   a transmitting unit that transmits the identification information acquired by the second identification-information acquiring unit and the access information acquired by the access information acquiring unit to the information processing system, and
the information processing system includes:
   a communication unit that performs communication with the display device via the network on the basis of the identification information transmitted from the terminal;
   an access unit, stored in a memory, that accesses the storage service by using the access information transmitted from the terminal, and
   a control unit that controls at least one of a file retrieving process and a file rewriting process using a function provided by the display device and a function provided by the storage service based on the access information.

2. The information sharing system according to claim 1, wherein
the information processing system further includes an encoded-image generating unit that receives the identification information transmitted from the display device and generates an encoded image into which the identification information transmitted from the display device is encoded,
the first identification-information acquiring unit transmits the identification information to the information processing system and requests the encoded image from the information processing system, and displays the encoded image transmitted from the information processing system in response to the request on the display, and
the second identification-information acquiring unit includes:
   an imaging unit that takes an image of a subject; and
   a decoding unit that decodes the encoded image taken by the imaging unit and extracts the identification information.

3. The information sharing system according to claim 1, wherein
the control unit acquires a file to be saved from the display device through the communication unit in response to a file save request from the display device, and causes the access unit to save the acquired file to the storage service in accordance with the access information.

4. The information sharing system according to claim 1, wherein
the information processing system further includes an identification-information generating unit that generates the identification information in response to a request from the display device and transmits the generated identification information to the display device through the communication unit.

5. The information sharing system according to claim 2, wherein
the display device further includes an image input unit that inputs an image and displays the image on the display, and
the encoded-image generating unit generates the encoded image in response to an access request for access to the storage service.

6. The information sharing system according to claim 5, wherein
the access request is a request to save an image input to the image input unit to the storage service.

7. The information sharing system according to claim 5, wherein
the access request is a request to read out an image saved to the storage service.

8. The information sharing system according to claim 4, wherein
the identification-information generating unit does not save the generated identification information.

9. An information sharing method implemented by an information sharing system including an information processing system composed of one or more information processing apparatuses and a terminal and display device connected to the information processing system via a network, the display device being equipped with a display on which an image is displayed, the information sharing method comprising:
   first acquiring, by the display device, identification information for identifying the display device on the network;
   second acquiring, by the terminal, the identification information from the display device;
   first accessing, by the terminal, a storage service via the network and acquiring access information used for accessing a storage service via the network, the access information being authenticated by an authentication service of the storage service in response to a request to access the storage service, the storage service and the authentication service being remote from the information processing system, the terminal, and the display device;
   transmitting, by the terminal, the identification information acquired at the second acquiring and the access information acquired at the first accessing to the information processing system;
   performing communication with, by the information processing system, the display device via the network on the basis of the identification information transmitted from the terminal;

second accessing, by the information processing system, the storage service by using the access information transmitted from the terminal; and controlling, via the information processing system, at least one of a file retrieving process and a file rewriting process using a function provided by the display device and a function provided by the storage service based on the access information.

10. The information sharing method according to claim 9, wherein
the information processing system further includes an encoded-image generating unit that receives the identification information transmitted from the display device and generates an encoded image into which the identification information transmitted from the display device is encoded,
at the first acquiring, transmitting the identification information to the information processing system and requesting the encoded image from the information processing system, and displaying the encoded image transmitted from the information processing system in response to the request on the display, and
at the second acquiring, taking an image of a subject, decoding the encoded image taken, and extracting the identification information.

11. The information sharing method according to claim 9, wherein
the method further includes acquiring a file to be saved from the display device at the communicating in response to a file save request from the display device, and save, at the second accessing, the acquired file to the storage service in accordance with the access information.

12. The information sharing method according to claim 9, wherein
the information processing system further includes an identification-information generating unit that generates the identification information in response to a request from the display device and transmits the generated identification information to the display device at the communicating.

13. The information sharing method according to claim 10, wherein
the display device further includes an image input unit that inputs an image and displays the image on the display, and
the encoded-image generating unit generates the encoded image in response to an access request for access to the storage service.

14. The information sharing method according to claim 13, wherein
the access request is a request to save an image input to the image input unit to the storage service.

15. The information sharing method according to claim 13, wherein
the access request is a request to read out an image saved to the storage service.

16. The information sharing method according to claim 12, wherein
the identification-information generating unit does not save the generated identification information.

* * * * *